US011202150B1

(12) United States Patent
Hoover

(10) Patent No.: US 11,202,150 B1
(45) Date of Patent: Dec. 14, 2021

(54) AUDIO CONTROL BASED ON DETERMINATION OF PHYSICAL SPACE SURROUNDING VEHICLE

(71) Applicant: Honda Motor Co., Ltd., Tokyo (JP)

(72) Inventor: Andrew R. Hoover, West Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/018,001

(22) Filed: Sep. 11, 2020

(51) Int. Cl.
*H03G 3/00* (2006.01)
*H04R 3/04* (2006.01)
*B60R 11/02* (2006.01)
*G06K 9/00* (2006.01)
*G06F 3/01* (2006.01)

(52) U.S. Cl.
CPC ............ *H04R 3/04* (2013.01); *B60R 11/0217* (2013.01); *G06F 3/011* (2013.01); *G06F 3/017* (2013.01); *G06K 9/00288* (2013.01); *G06K 9/00362* (2013.01); *G06K 9/00805* (2013.01); *G06F 2203/011* (2013.01); *H04R 2430/01* (2013.01); *H04R 2499/13* (2013.01)

(58) Field of Classification Search
CPC ........................................................ H03G 3/00
See application file for complete search history.

(56) References Cited

U.S. PATENT DOCUMENTS

| 7,483,539 | B2 | 1/2009 | Stark et al. |
| 7,724,909 | B2 | 5/2010 | Stark et al. |
| 7,957,540 | B2 | 6/2011 | Ludwig et al. |
| 8,976,986 | B2 | 3/2015 | Angeloff et al. |
| 9,736,613 | B2 | 8/2017 | Osman |
| 10,000,152 | B1* | 6/2018 | Scalea ................... B60Q 9/008 |
| 10,175,340 | B1* | 1/2019 | Abari ................. G06K 9/00805 |
| 2019/0052967 | A1* | 2/2019 | Kim ......................... B60Q 9/00 |
| 2019/0308617 | A1* | 10/2019 | Groult ..................... B60Q 1/46 |
| 2019/0318623 | A1* | 10/2019 | Wiens .................. G01S 15/931 |
| 2020/0402249 | A1* | 12/2020 | Kim ......................... G01S 17/42 |
| 2021/0132197 | A1* | 5/2021 | Wachter .................. G01S 17/04 |
| 2021/0171144 | A1* | 6/2021 | Champoux ........... B62J 45/415 |

FOREIGN PATENT DOCUMENTS

| JP | H10262299 A | 9/1998 |
| JP | 2007320472 A | 12/2007 |

* cited by examiner

*Primary Examiner* — Olisa Anwah
(74) *Attorney, Agent, or Firm* — American Honda Motor Co., Inc.; Clifford B Vaterlaus

(57) ABSTRACT

An audio control device for a vehicle is provided. The audio control device includes control circuitry that is communicatively coupled to one or more audio reproduction devices of the vehicle. From one or more sensors associated with the vehicle, the control circuitry receives one or more signals. corresponding to a detection of a plurality of objects in a physical space surrounding the vehicle. The control circuitry determines a scene of the physical space, based on the plurality of objects. The control circuitry determines distance between a first object of the detected plurality of objects and the vehicle, based on the received one or more signals. The control circuitry adjusts one or more audio parameters of the audio reproduction devices, based on the determined scene and the determined distance. The control circuitry controls the audio reproduction devices to reproduce a first audio output based on the adjusted audio parameters.

16 Claims, 9 Drawing Sheets

| Determined Scene 402 | Determined Distance 404 | One or More Audio Parameters 406 || Audio Output 408 |
|---|---|---|---|---|
| | | Volume Setting 406A | Frequency Setting 406B | |
| Scenery Scene | A1 | $V_{A1}$ | $F_{A1}$ | Soothing Music |
| | A2 | $V_{A2}$ | $F_{A2}$ | |
| Playground Scene | B1 | $V_{B1}$ | $F_{B1}$ | Motivational Music |
| | B2 | $V_{B2}$ | $F_{B2}$ | |
| Parking Lot Scene | C1 | $V_{C1}$ | $F_{C1}$ | Instrumental Music |
| | C2 | $V_{C2}$ | $F_{C2}$ | |
| Party Scene | D1 | $V_{D1}$ | $F_{D1}$ | Dance Music |
| | D2 | $V_{D2}$ | $F_{D2}$ | |

AUDIO CONTROL BASED ON DETERMINATION OF PHYSICAL SPACE SURROUNDING VEHICLE

BACKGROUND

Recent advancements in the field of audio reproduction devices (such as, speakers) have led to development of various technologies and systems to enhance reproduction of audio content. Typically, an audio reproduction device associated with a vehicle may be designed to provide an optimum audio output to a user (such as, an occupant of the vehicle) who may be located within the vehicle. However, when the user is located in a physical space (such as, a physical environment) surrounding the vehicle, an audio output of the audio reproduction device associated with the vehicle may be unsatisfactory. This may be due to various environmental factors (e.g., noise and other objects) in the surroundings of the vehicle. Therefore, there is a need for a system that may automatically control the audio reproduction device to provide an optimum audio output to the user even when the user may be located outside the vehicle.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an audio control device for a first vehicle is provided. The audio control device may include control circuitry communicatively coupled to one or more audio reproduction devices of the first vehicle. The control circuitry may be configured to receive, from one or more sensors associated with the first vehicle, one or more signals. The one or more signals may correspond to a detection of a plurality of objects present in a physical space surrounding the first vehicle. The control circuitry may be further configured to determine a scene of the physical space surrounding the first vehicle, based on the plurality of objects detected from the received one or more signals. The control circuitry may be further configured to determine a distance between a first object of the detected plurality of objects and the first vehicle, based on the received one or more signals. The control circuitry may be further configured to adjust one or more audio parameters associated with the one or more audio reproduction devices of the first vehicle, based on the determined scene of the physical space surrounding the first vehicle and the determined distance between the first object and the first vehicle. The control circuitry may be further configured to control the one or more audio reproduction devices to reproduce a first audio output based on the adjusted one or more audio parameters associated with the one or more audio reproduction devices.

According to another embodiment of the disclosure, a method in an audio control device for a first vehicle is provided. The method may include a reception of, from one or more sensors associated with the first vehicle, one or more signals. The one or more signals may correspond to a detection of a plurality of objects present in a physical space surrounding the first vehicle. The method may further include a determination of a scene of the physical space surrounding the first vehicle, based on the plurality of objects detected from the received one or more signals. The method may further include a determination of a distance between a first object of the detected plurality of objects and the first vehicle based on the received one or more signals. The method may further include an adjustment of one or more audio parameters associated with one or more audio reproduction devices of the first vehicle, based on the determined scene of the physical space surrounding the first vehicle and the determined distance between the first object and the first vehicle. The method may further include a control of the one or more audio reproduction devices to reproduce a first audio output based on the adjusted one or more audio parameters associated with the one or more audio reproduction devices.

BRIEF DESCRIPTION OF THE DRAWINGS

FIG. 4 is a table that illustrates exemplary data which indicates associations between scenes of a physical space surrounding the vehicle, distance between objects and the vehicle, and one or more audio parameters for the audio control, in accordance with an embodiment of the disclosure.

DETAILED DESCRIPTION

Figure 1:
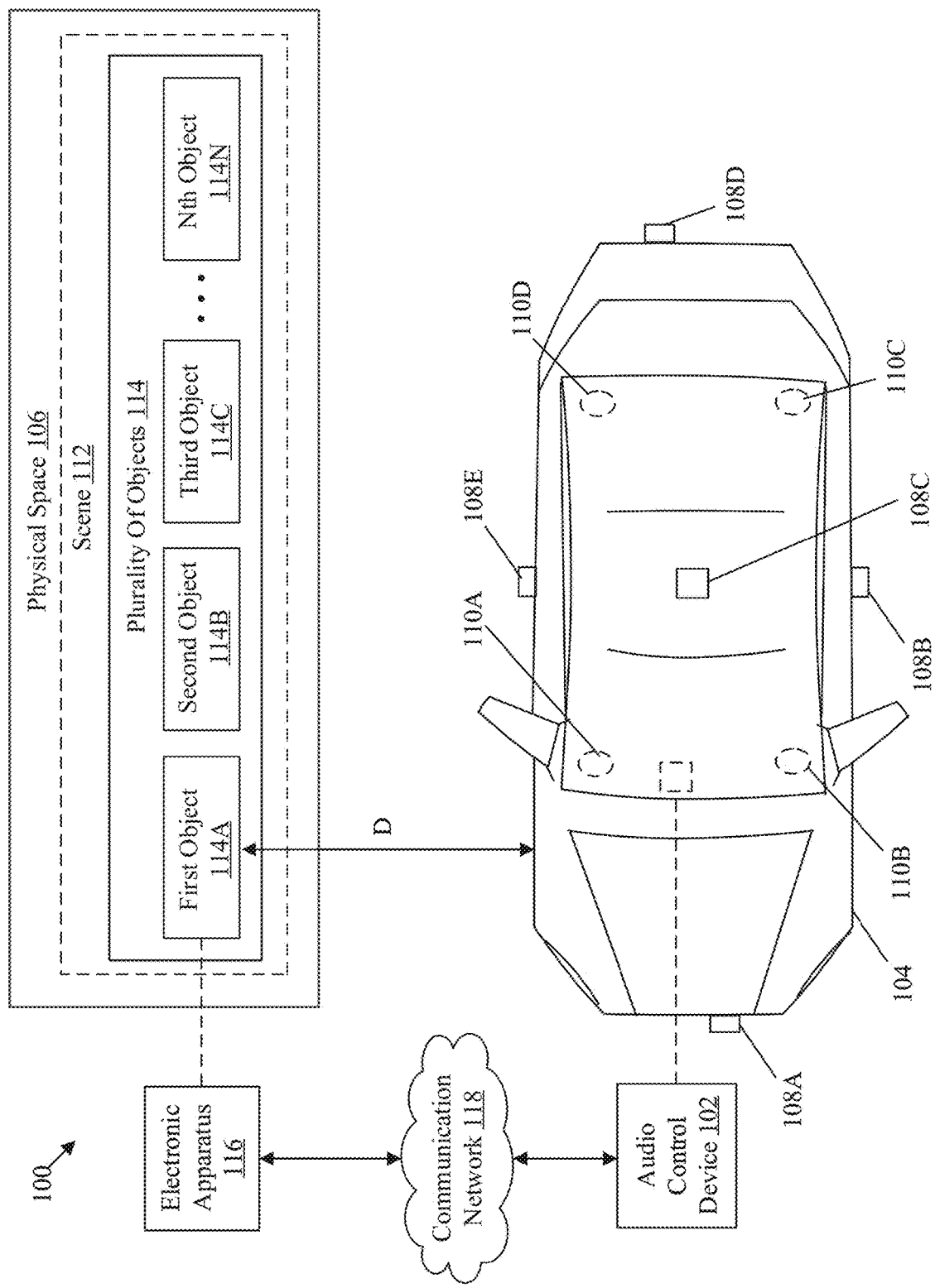
FIG. 1 is a block diagram that illustrates an exemplary environment for audio control based on determination of a physical space surrounding a vehicle, in accordance with an embodiment of the disclosure.

Various embodiments of the present disclosure may be found in an audio control device for a vehicle which may provide an optimum audio control based on a determination of a physical space surrounding the vehicle. The audio control device may be configured to control one or more audio reproduction devices (such as, speakers) of the vehicle based on determination of the physical space surrounding the vehicle. The audio control device may be configured to receive one or more signals that may correspond to a detection of a plurality of objects (for example various animate or inanimate objects) present in the physical space surrounding the vehicle, and configured to determine a distance between a first object (such as, a person, a vehicle, or an obstacle) of the detected plurality of objects and the vehicle. The audio control device may be configured to receive the one or more signals from one or more sensors associated with the vehicle. Examples of the one or more sensors may include, but are not limited to an image capturing device, a proximity sensor, a Light Detection and Ranging (LIDAR) sensor, a Sound Navigation and Ranging (SONAR) sensor, a Radio Detection and Ranging (RADAR)

sensor, or a combination thereof. The audio control device may be further configured to determine a scene of the physical space surrounding the vehicle, based on the detected plurality of objects. Examples of the determined scene may include, but are not limited to a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene. The audio control device may be further configured to adjust one or more audio parameters associated with the one or more audio reproduction devices of the vehicle, based on the determined scene and the determined distance between the first object and the vehicle. Examples of the one or more audio parameters may include, but are not limited to a volume setting, a frequency setting, an equalization mode, an activation status of the one or more audio reproduction devices, or a directionality of an audio reproduced by the one or more audio reproduction devices. The audio control device may be further configured to control the one or more audio reproduction devices to reproduce a first audio output (for example media content, such a song or an audio file) based on the adjusted one or more audio parameters associated with the one or more audio reproduction devices. In certain scenarios, the first output audio output may be an audio output of a user-selected audio content for reproduction by the one or more audio reproduction devices. In an embodiment, the audio control device may determine the first audio output based on the determined scene of the physical space surrounding the vehicle. The audio control device may be configured to control the one or more audio reproduction devices of the vehicle to provide an optimum audio output based on the determined scene and the determined distance between the first object and the vehicle.

The disclosed audio control device may control the audio reproduction device to suitably adjust the reproduction of the audio content based on a distance of the user in the physical space from the vehicle. For example, the audio control device may control the audio reproduction device to amplify a volume of the audio output of the audio reproduction device, if the user may be located at a distance greater than a threshold distance (for example in certain meters) from the vehicle. Further, if the user may be located at a distance lesser than the threshold distance from the vehicle, the audio control device may control the audio reproduction device to attenuate a volume of the audio output of the audio reproduction device. This may enable the audio reproduction device to dynamically output the audio content at an optimum volume that may be clearly audible to the user even if the user changes the distance from the vehicle. The dynamic control of the audio reproduction device may also save power as the audio control device may only amplify the volume of the audio output when required.

The disclosed audio control device may suitably select the audio content and adjust the reproduction of the audio content, by the audio reproduction device, based on the determined scene of the physical space surrounding the vehicle. In an example, in case of a scenery scene, the audio control device may control the audio reproduction device to attenuate a volume of the audio output (for example soothing music). Further, in case of a garden/playground scene, the audio control device may control the audio reproduction device to amplify a volume of the audio output (for example a sports or workout related music). Moreover, in case of a parking lot scene or a road scene, the audio control device may control the audio reproduction device to attenuate a volume of the audio output determined, for example, as an instrumental music. Thus, the audio control device may automatically select appropriate audio content for a particular scene associated with the physical space surrounding the vehicle, and accordingly adjust the reproduction of the selected audio content by the audio reproduction device. The disclosed audio control device may thereby control the audio reproduction device of the vehicle to produce a satisfactory audio output (i.e. at an optimum audio setting) for a user who may be located in the physical space surrounding the vehicle.

FIG. 1 is a block diagram that illustrates an exemplary environment for audio control based on determination of a physical space surrounding a vehicle, in accordance with an embodiment of the disclosure. With reference to FIG. 1, there is shown a network environment 100. The network environment 100 may include an audio control device 102, a first vehicle 104, and a physical space 106. The physical space 106 may be surrounding the first vehicle 104. The first vehicle 104 may further include one or more sensors (such as, a first sensor 108A, a second sensor 108B, a third sensor 108C, a fourth sensor 108D, and a fifth sensor 108E), and one or more audio reproduction devices 110A-110D (such as, a first audio reproduction device 110A, a second audio reproduction device 110B, a third audio reproduction device 110C, and a fourth audio reproduction device 110D). The physical space 106 may include a scene 112 that may include a plurality of objects 114. The plurality of objects 114 may include a first object 114A, a second object 114B, a third object 114C, and an $N^{th}$ object 114N, as shown in FIG. 1. The network environment 100 may further include an electronic apparatus 116. The audio control device 102 and the electronic apparatus 116 may be communicatively coupled with each other, via a communication network 118.

The N number of plurality of objects 114 shown in FIG. 1 is presented merely as an example. The physical space 106 in the network environment 100 of FIG. 1 may include more or less than N number of objects, without departure from the scope of the disclosure. Further, five number of sensors and four number of audio reproduction devices are presented merely as an example in FIG. 1. The first vehicle 104 in the network environment 100 of FIG. 1 may include more than five or less than five sensors. In addition, the first vehicle 104 in the network environment 100 of FIG. 1 may include more than four or less than four number of sensors, without any deviation from the scope of the disclosure.

The audio control device 102 may include suitable logic, circuitry, code, and/or interfaces that may be configured to control the one or more audio reproduction devices 110A-110D (such as, the first audio reproduction device 110A, the second audio reproduction device 110B, the third audio reproduction device 110C, and the fourth audio reproduction device 110D) to reproduce a first audio output. The audio control device 102 may be configured to receive, from one or more sensors (such as the first sensor 108A, the second sensor 108B, the third sensor 108C, the fourth sensor 108D, and the fifth sensor 108E) associated with the first vehicle 104, one or more signals. The one or more signals correspond to a detection of the plurality of objects 114 present in the physical space 106 surrounding the first vehicle 104. The audio control device 102 may be configured to determine the scene 112 of the physical space 106 surrounding the first vehicle 104, based on the plurality of objects 114 detected from the received one or more signals. The audio control device 102 may be further configured to determine a distance (such as, a distance 'D') between a first object (for example the first object 114A) of the detected plurality of objects 114 and the first vehicle 104, based on the received one or more signals. The audio control device 102 may be further configured to adjust one or more audio parameters (such as volume, equalization, etc.) associated with the one or more audio reproduction devices 110A-110D of the first vehicle 104, based on the determined scene 112 (such a type of the scene 112) and the determined distance (e.g., distance 'D') between the first object 114A and the first vehicle 104. Examples of the audio control device 102 may include, but are not limited to, a vehicle control system, an in-vehicle infotainment (IVI) system, an in-car entertainment (ICE) system, an automotive Head-up Display (HUD), an automotive electronic dashboard, a vehicle music system, a human-machine interface (HMI), a computing device, a smartphone, a cellular phone, a mobile phone, a personal digital assistant (PDA), a mainframe machine, and/or a consumer electronic (CE) device. It may be noted here that the position, orientation, arrangement, or shape of the audio control device 102 shown in FIG. 1, is presented merely as an example. The present disclosure may be also applicable to other positions, orientations, arrangements, or shapes of the audio control device 102, without deviation from the scope of the disclosure.

The first vehicle 104 may be an autonomous, a semi-autonomous, or a non-autonomous vehicle. Examples of the first vehicle 104 may include, but are not limited to, an electric vehicle, a hybrid vehicle, and/or a vehicle that uses a combination of one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. In some embodiments, the first vehicle 104 may be a sedan-type or a hatch-back type four-wheeler vehicle. It may be noted here that the four-wheeler first vehicle 104 are merely shown as examples in FIG. 1. The present disclosure may be also applicable to other types of vehicles such as two-wheeler vehicles, three-wheeler vehicles, or vehicles with more than four wheels. A description of other types of vehicles has been omitted from the disclosure for the sake of brevity.

The one or more sensors (such as, the first sensor 108A, the second sensor 108B, the third sensor 108C, the fourth sensor 108D, and the fifth sensor 108E) may include suitable logic, circuitry, code, and/or interfaces that may be configured to generate an object detection signal in order to determine the plurality of objects 114 in the physical space 106 surrounding the first vehicle 104. The one or more sensors may be further configured to transmit the object detection signal to the audio control device 102. Examples of the one or more sensors may include, but are not limited to, an image capturing device, a proximity sensor, a Light Detection and Ranging (LIDAR) sensor, a Sound Navigation and Ranging (SONAR) sensor, a Radio Detection and Ranging (RADAR) sensor, or a combination thereof.

For example, the first sensor 108A may be the proximity sensor, the second sensor 108B may be the SONAR sensor, the third sensor 108C may be the image capturing device, the fourth sensor 108D may be the LIDAR sensor, and the fifth sensor 108E may be the RADAR sensor. In an example, the proximity sensor (e.g., the first sensor 108A) may be implemented as an infra-red sensor. The proximity sensor may be configured to detect the presence of the plurality of objects 114 in the physical space 106 surrounding the first vehicle 104. The proximity sensor may transmit the object detection signal to the audio control device 102 based on the detection of the presence of the plurality of objects 114. In an embodiment, the SONAR sensor (for example, the second sensor 108B) may be configured to emit sound waves to the physical space 106 surrounding the first vehicle 104 and determine a time taken to receive sound waves that may be bounced back from the plurality of objects 114 of the physical space 106. Based on the determined time taken to receive the sound waves and the speed of sound in air, the SONAR sensor may determine a distance of each of the plurality of objects 114 from the first vehicle 104. An example implementation of the SONAR sensor may include, but is not limited to, an Ultrasonic sensor that may emit sound waves in the ultrasonic frequency range (i.e., high frequency sound waves).

The image capturing device (for example, the third sensor 108C) may be configured to capture one or more images of the physical space 106 surrounding the first vehicle 104. The image capturing device may be further configured to determine or recognize the plurality of objects 114 in the physical space 106 based on the captured one or more images. The image capturing device may generate the object detection signal (for example the captured one or more images) based on the determined plurality of objects 114, and transmit the generated object detection signal to the audio control device 102. Examples of the image capturing device may include, but are not limited to, an image sensor, a wide-angle camera, an action camera, a closed-circuit television (CCTV) camera, a camcorder, a digital camera, a time-of-flight camera (ToF camera), a night-vision camera, and/or other image capture devices. In an embodiment, the image capturing device (the third sensor 108C) may include a 360-degree camera situated on a roof of the vehicle 104 as shown in FIG. 1. The 360-degree camera may include suitable logic, circuitry, or interfaces, that may be configured to capture a 360-degree view of the surroundings of the first vehicle 104. In accordance with an embodiment, the 360-degree camera may further include a plurality of image sensors (not shown) to capture the 360-degree view of the surroundings of the first vehicle 104. Each image sensor of the plurality image sensors may be configured to capture a portion of the 360-degree view of the surroundings of the first vehicle 104. In accordance with an embodiment, the 360-degree camera may be configured to stitch each captured portion of the plurality image sensors to generate the 360-degree view of the surroundings of the first vehicle 104. In accordance with an embodiment, the 360-degree camera may be installed on a roof of the vehicle 104 as shown in FIG. 1. Examples of the 360-degree camera may include, but are not limited to, an omnidirectional camera, a panoramic camera, an action camera, a wide-angle camera, a closed-circuit television (CCTV) camera, and/or other image capturing or devices with 360-degree view capturing capability.

The LIDAR sensor (for example, the fourth sensor 108D) may be configured to emit rapid light pulses to the physical space 106 surrounding the first vehicle 104 and determine a time of flight of the light pulses to reach back the LIDAR sensor after the light pulses may be bounced back from the plurality of objects 114 of the physical space 106. Based on the determined time of flight of the light pulses and the speed of light in air, the LIDAR sensor may determine a distance of each of the plurality of objects 114 from the first vehicle 104. In an embodiment, the light pulses may be laser light and the LIDAR sensor may use detection methods including one of: a direct energy detection (or incoherent detection) or a coherent detection. Further, in both types of detection methods, the LIDAR may use a pulse model including one of: a micro-pulse system or a high energy system. Further, the LIDAR sensor may be associated with a navigation and positioning system, such as, a Global Positioning System (GPS) sensor and an Inertia Measurement Unit (IMU) sensor. The GPS sensor may be used for determination of an absolute position of the LIDAR sensor and the IMU may be used for determination of an absolute orientation of the LIDAR sensor. In an embodiment, the RADAR sensor (for example, the fifth sensor 108E) may be configured to emit radio frequency (RF) waves to the physical space 106 surrounding the first vehicle 104 and determine a time of flight of RF waves to reach back the RADAR sensor after the RF waves may be bounced back from the plurality of objects 114 of the physical space 106. Based on a phase shift between the emitted RF waves and the received RF waves, and/or the determined time of flight of the RF waves; and the speed of RF waves in air, the RADAR sensor may determine one or more of a distance, movement, or velocity of each of the plurality of objects 114 with respect to the first vehicle 104. It may be noted that the first sensor 108A, the second sensor 108B, the third sensor 108C, the fourth sensor 108D, and the fifth sensor 108E shown in FIG. 1 are presented merely as an example. The one or more sensors may include only one sensor (for example the image capture device) to detect the plurality of objects 114 of the physical space 106 and the distance ('D') between the first object 114A and the first vehicle 104, without deviation from the scope of the disclosure. It may be noted here that the positions, orientations, arrangements, or shapes of the one or more sensors shown in FIG. 1, is presented merely as an example. The present disclosure may be also applicable to other positions, orientations, arrangements, or shapes of the one or more sensors, without deviation from the scope of the disclosure.

The one or more audio reproduction devices 110A-110D (such as the first audio reproduction device 110A) may include suitable logic, circuitry, code, and/or interfaces that may be configured to reproduce audio output associated with audio content (for example a song, a test tone, an audio clip, or a musical tone). The one or more audio reproduction devices 110A-110D (such as the first audio reproduction device 110A) may be configured to receive electrical signals or instructions (i.e. related to the audio content) from the audio control device 102 for playback of the audio content. The one or more audio reproduction devices 110A-110D may convert the received electrical signals or instructions into the audio output for the reproduction of the audio content. In some embodiments, the first audio reproduction device 110A may be integrated with the first vehicle 104. The first audio reproduction device 110A may be an internal component of the first vehicle 104 and the entire functionality of the first audio reproduction device 110A may be included in the first vehicle 104. In some embodiment, the first audio reproduction device 110A may be communicably coupled with the audio control device 102 of the first vehicle 104, via an in-vehicle communication network (not shown). The functions of the second audio reproduction device 110B, the third audio reproduction device 110C, and the fourth audio reproduction device 110D may be same as the functions of the first audio reproduction device 110A described, for example, in FIG. 1. Therefore, the description of the second audio reproduction device 110B, the third audio reproduction device 110C, and the fourth audio reproduction device 110D is omitted from the disclosure for the sake of brevity. Examples of the first audio reproduction device 110A may include, but are not limited to, an external wireless speaker, an internal speaker, an external wired speaker, a woofer, a sub-woofer, a tweeter, a loudspeaker, a monitor speaker, an optical audio device, or sound output device.

It may be noted here that the positions, orientations, arrangements, or shapes of the one or more audio reproduction devices 110A-110D shown in FIG. 1, is presented merely as an example. The present disclosure may be also applicable to other positions, orientations, arrangements, or shapes of the one or more audio reproduction devices 110A-110D, without deviation from the scope of the disclosure. For example, each of the first audio reproduction device 110A, the second audio reproduction device 110B, the third audio reproduction device 110C, and the fourth audio reproduction device 110D may be a speaker positioned at respective door of the first vehicle 104. In another example, the first vehicle 104 may only include one audio reproduction device present inside the first vehicle 104 and communicably coupled with the audio control device 102.

The physical space 106 surrounding the first vehicle 104 may include a three-dimensional physical area that may surround the first vehicle 104 in a physical environment. For example, the physical space 106 may a road, a parking space, a garden area, or any area where in the first vehicle 104 may be parked or moving at a low speed. The physical space 106 may include the scene 112, that may further include the plurality of objects 114 in the physical environment. Examples of the scene 112 in the physical space 106 may include, but are not limited to, a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene. The audio control device 102 may be configured to determine the scene 112 based on the determined plurality of objects 114 present in the physical space 106. The plurality of objects 114 may include at least one of, but not limited to, a person, another vehicle different from the first vehicle 104, or an obstacle to the first vehicle 104. For example, the first object 114A may be the person (such as the occupant of the first vehicle), the second object 114B may be the other vehicle, and the third object 114C may be the obstacle.

The electronic apparatus 116 may include suitable logic, circuitry, interfaces, and/or code that may be associated with the first object 114A and may be configured to transmit an audio signal associated with the first object 114A to the audio control device 102. In an embodiment, the electronic apparatus 116 may be configured to receive a notification signal indicative of one or more operations associated with the first vehicle 104 from the audio control device 102. Further, the electronic apparatus 116 may be configured to transmit hearing information indicative of a listening ability of the person (i.e. the first object 114A) to the audio control device 102. Examples of the electronic apparatus 116 associated with the first object 114A may include, but are not limited to, a hand-held device, a computing device, a smartphone, a cellular phone, a mobile phone, a gaming device, a mainframe machine, a server, a computer work-station, and/or a consumer electronic (CE) device.

The communication network 118 may include a communication medium through which the audio control device 102, and the electronic apparatus 116 may communicate with one another. Examples of the communication network 118 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 118, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic apparatus 116 (i.e. associated with the first object 114A, i.e. occupant of the first vehicle 104) may be configured to receive a user input, for example, to turn-on the audio control device 102, to control the one or more audio reproduction devices 110A-110D based on a determination of the physical space 106 surrounding the first vehicle 104. In an embodiment, the audio control device 102 may be configured to directly receipt the user input from the occupant of the first vehicle 104, to control the one or more audio reproduction devices 110A-110D based on the determination of the scene 112 of the physical space 106 surrounding the first vehicle 104. In another embodiment, the audio control device 102 may automatically detect, (for example, during a playback of an audio output), that the occupant of the first vehicle 104 may be moving out of the first vehicle 104 with one of doors or windows of the first vehicle 104 open to experience the played-back audio output from the outside (i.e. physical space 106) of the first vehicle 104. The audio control device 102 may be configured to receive, from the one or more sensors (such as, the first sensor 108A, the second sensor 108B, the third sensor 108C, the fourth sensor 108D, and/or the fifth sensor 108E) associated with the first vehicle 104, one or more signals. The one or more signals may correspond to a detection of the plurality of objects 114 located in the physical space 106 surrounding the first vehicle 104. In an embodiment, the one or more sensors (such as, the first sensor 108A, the second sensor 108B, the third sensor 108C, the fourth sensor 108D, and the fifth sensor 108E) may be in-built sensors of the first vehicle 104 and/or communicatively coupled to the first vehicle 104. The audio control device 102 may thereby detect the plurality of objects 114 located in the physical space 106 based on the one or more signals received from the one or more sensors.

The audio control device 102 may be further configured to determine the scene 112 of the physical space 106 surrounding the first vehicle 104, based on the plurality of objects 114 detected from the received one or more signals. The determination of the scene 112 based on the detected plurality of objects 114 is described, for example, in FIG. 3A. The audio control device 102 may be further configured to determine a distance (e.g., the distance 'D') between the first object 114A (for example an occupant of the first vehicle 104 moving or standing outside the first vehicle 104) of the detected plurality of objects 114 and the first vehicle 104, based on the received one or more signals. The audio control device 102 may be further configured to adjust one or more audio parameters (such as volume, equalization, activation/deactivation) associated with the one or more audio reproduction devices 110A-110D of the first vehicle 104. The adjustment of the one or more audio parameters may be based on the determined scene 112 of the physical space 106 surrounding the first vehicle 104 and the determined distance 'D' between the first object 114A and the first vehicle 104. The adjustment of the one or more audio parameters is further described, for example, in FIG. 4. The audio control device 102 may be further configured to control the one or more audio reproduction devices 110A-110D to reproduce a first audio output based on the adjusted one or more audio parameters associated with the one or more audio reproduction devices 110A-110D, as described, for example, in FIG. 3A. Thus, the audio control device 102 may provide an optimum audio experience to a user (for example the first object 114A or the occupant of the vehicle) present in the physical space 106 surrounding the first vehicle 104.

The disclosed audio control device 102 may control the one or more audio reproduction devices 110A-110D to suitably adjust the one or more audio parameters based on the distance 'D' of the first object 114A (e.g., a user) from the first vehicle 104 and the determined scene 112. For example, in case the distance 'D' is greater than a threshold distance and the determined scene 112 is a scenery scene, the audio control device 102 may amplify a volume (i.e. audio parameter) of the one or more audio reproduction devices 110A-110D for reproduction of the first audio output. In another example, if the distance 'D' is less than the threshold distance and the determined scene 112 is a parking lot scene, the audio control device 102 may attenuate the volume of the one or more audio reproduction devices 110A-110D for reproduction of the first audio output. This may enable the one or more audio reproduction devices 110A-110D to reproduce the first audio output at the volume that may be clearly audible and may not be loud for the user (e.g., the first object 114A) located in the physical space 106 surrounding the first vehicle 104. In some embodiments, the audio control device 102 may also detect the three-dimensional (3D) location of the user around the first vehicle 104 and accordingly adjust the one or more audio parameter or activate/deactivate the one or more audio reproduction devices 110A-110D based on the detected three-dimensional (3D) location. This may also save power of the first vehicle 104 or of the one or more audio reproduction devices 110A-110D as the audio reproduction device may only amplify the volume (or other audio parameters) for the reproduction of the first audio output when required. The disclosed audio control device 102 may thereby control the one or more audio reproduction devices 110A-110D to reproduce a satisfactory and optimum audio output (or sound effects) for the user who may be located in the physical space 106 surrounding the first vehicle 104.

Figure 2:
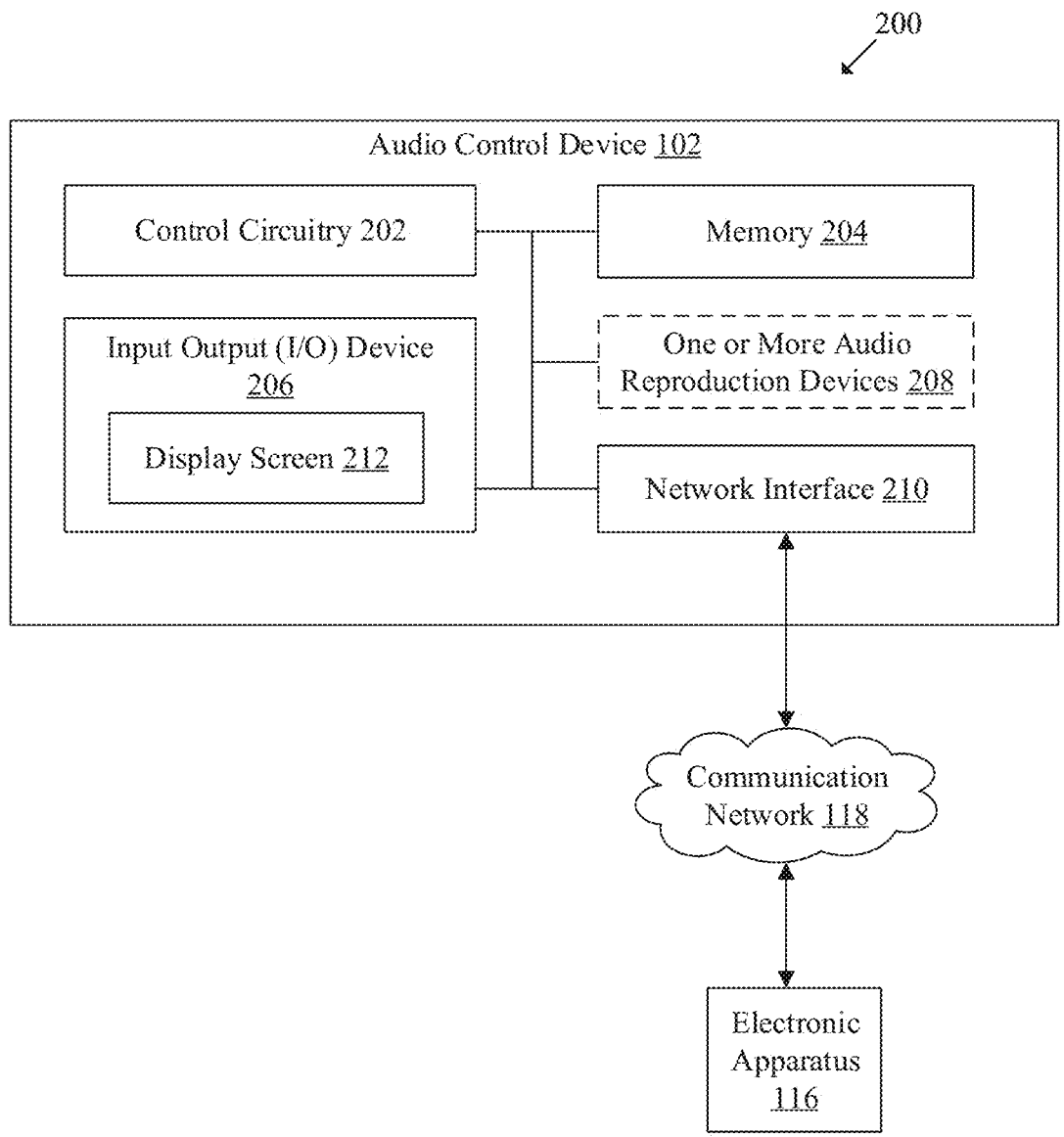
FIG. 2 is a block diagram that illustrates an exemplary audio control device for audio control based on determination of a physical space surrounding a vehicle, in accordance with an embodiment of the disclosure.

FIG. 2 is a block diagram that illustrates an exemplary audio control device for audio control based on determination of a physical space surrounding a vehicle, in accordance with an embodiment of the disclosure. FIG. 2 is explained in conjunction with elements from FIG. 1. With reference to FIG. 2, there is shown a block diagram 200 of the audio control device 102. The audio control device 102 may include control circuitry 202, memory 204, an input/output (I/O) device 206, one or more audio reproduction devices 208, and a network interface 210. The I/O device 206 may further include a display screen 212. The network interface 210 may connect the audio control device 102 with the electronic apparatus 116, via the communication network 118.

The control circuitry 202 may include suitable logic, circuitry, and/or interfaces that may be configured to execute program instructions associated with different operations to be executed by the audio control device 102. For example, some of the operations may include reception of the one or more signals, detection of the plurality of objects 114, determination of the scene 112, determination of the distance 'D' between the first object 114A and the first vehicle 104, and adjustment of the one or more audio parameters. The control circuitry 202 may be further configured to control the one or more audio reproduction devices 110A-110D to reproduce the first audio output based on the adjusted one or more audio parameters associated with the one or more audio reproduction devices 110A-110D. The control circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The control circuitry 202 may be implemented based on a number of processor technologies known in the art. Examples of implementations of the control circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the control circuitry 202. The memory 204 may be configured to store one or more of, but not limited to, information associated with the determined scene 112, the determined distance 'D', the adjusted one or more audio parameters and audio content. In an embodiment, the memory 204 may store a look-up table that may store an association (as shown in FIG. 4) between the determined scene, the determined distance, and the one or more audio parameters. In some embodiments, the memory 204 may store a plurality of sample object images to detect the plurality of objects 114 based on the one or more captured images by the one or more sensors. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input and provide an output based on the received input. The I/O device 206 may include various input and output devices, which may be configured to communicate with the control circuitry 202. For example, audio control device 102 may receive (via the I/O device 206) the user input from the occupant of the first vehicle 104 to reproduce the audio content or the first audio output. Examples of the I/O device 206 may include, but are not limited to, a touch screen, a keyboard, a mouse, a joystick, a display device (for example, the display screen 212), a microphone, or a speaker (for example one or more audio reproduction devices 110A-110D if integrated with the audio control device 102). In some embodiments, the user input (such as hearing information of the occupant) may be received through the I/O device 206.

The display screen 212 may comprise suitable logic, circuitry, and interfaces that may be configured to display an output of the audio control device 102. The display screen 212 may be utilized to render information about at least one of: the determined scene 112, the determined distance 'D', the adjusted one or more audio parameters and the audio content. In some embodiments, the display screen 212 may be an external display device associated with the audio control device 102. The display screen 212 may be a touch screen which may enable a user to provide a user input via the display screen 212. The touch screen may be at least one of a resistive touch screen, a capacitive touch screen, a thermal touch screen or any other touch screen using which inputs can be provided to the display screen 212 or the control circuitry 202. The display screen 212 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 212 may refer to a display screen of a head mounted device (HMD), a smart-glass device, a see-through display, a projection-based display, an electro-chromic display, or a transparent display.

The functions of the one or more audio reproduction devices 208 may be same as the functions of the one or more audio reproduction devices 110A-110D described, for example, in FIG. 1. Therefore, the description of the one or more audio reproduction devices 208 is omitted from the disclosure for the sake of brevity. In some embodiments, the one or more audio reproduction devices 208 may be integrated with the audio control device 102. The one or more audio reproduction devices 208 may be an internal component of the audio control device 102 and the entire functionality of the one or more audio reproduction devices 208 may be included in the audio control device 102. In some embodiments, the one or more audio reproduction devices 208 may be communicatively coupled with the audio control device 102 and may be positioned within the first vehicle 104 as shown, for example, in FIG. 1. Examples of the one or more audio reproduction devices 208 may include, but are not limited to, an external wireless speaker, an internal speaker, an external wired speaker, a woofer, a sub-woofer, a tweeter, a loudspeaker, a monitor speaker, an optical audio device, or sound output device.

The network interface 210 may comprise suitable logic, circuitry, interfaces, and/or code that may be configured to facilitate communication between the audio control device 102 the electronic apparatus 116, and the one or more audio reproduction devices 208, via the communication network 118. The network interface 210 may be implemented by use of various known technologies to support wired or wireless communication of the audio control device 102 with the communication network 118. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The operations of the control circuitry 202 are described, for example, in FIGS. 3A, 3B, 3C, 3D, 4, 5 and 6. It may be noted that the audio control device 102 shown in FIG. 2 may include various other components or systems. The description of the other components or systems of the audio control device 102 has been omitted from the disclosure for the sake of brevity.

Figure 3A:
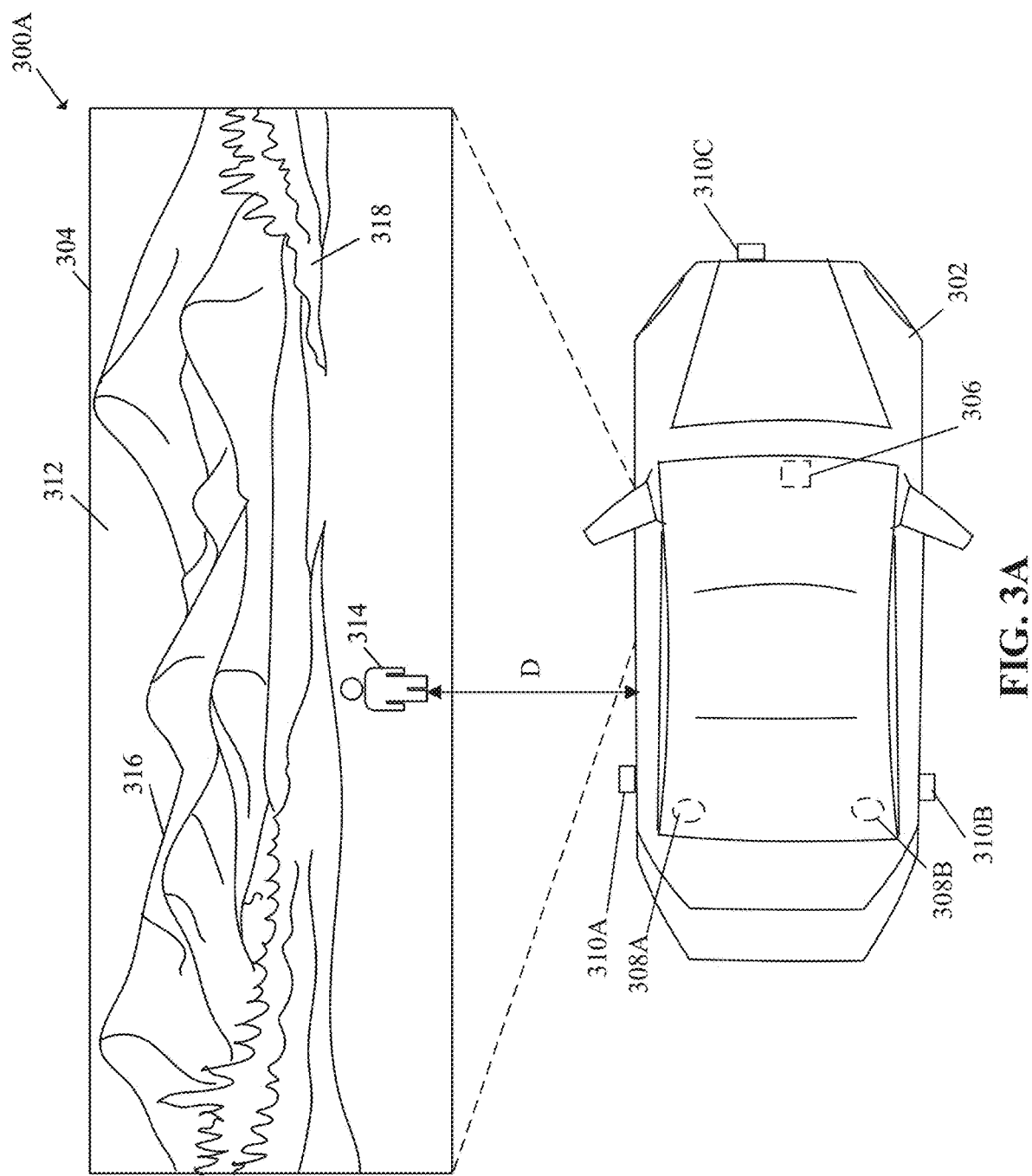
FIGS. 3A, 3B, 3C, and 3D illustrate exemplary scenarios for audio control of the audio control device of FIG. 2 based on determination of a physical space surrounding a vehicle, in accordance with an embodiment of the disclosure.

FIGS. 3A, 3B, 3C, and 3D illustrate exemplary scenarios for control of an audio reproduction device by the audio control device of FIG. 2 based on determination of a physical space surrounding a vehicle, in accordance with an embodiment of the disclosure. FIGS. 3A, 3B, 3C, and 3D are explained in conjunction with elements from FIGS. 1 and 2. With reference to FIG. 3A, there is shown a first scenario 300A. The first scenario 300A may include a first vehicle 302 as an exemplary implementation of the first vehicle 104 of FIG. 1, and include a physical space 304 surrounding the first vehicle 302. In the first scenario 300A, the first vehicle 302 may be in stationary or static state close to the physical space 304. The first vehicle 302 may include an audio control device 306 as an exemplary implementation of the audio control device 102 of FIG. 1. The first vehicle 302 may further include one or more audio reproduction devices, such as, a first audio reproduction device 308A, and a second audio reproduction device 308B, as an exemplary implementation of the one or more audio reproduction devices 110A-110D (such as, the first audio reproduction device 110A, the second audio reproduction device 110B, the third audio reproduction device 110C, and the fourth audio reproduction device 110D) of FIG. 1. The first vehicle 302 may further include a first sensor 310A, a second sensor 310B, and a third sensor 310C as an exemplary implementation of the one or more sensors (such as, the first sensor 108A, the second sensor 108B, the third sensor 108C, the fourth sensor 108D, and the fifth sensor 108E) of FIG. 1. The physical space 304 surrounding the first vehicle 302 may include a scene 312 as an exemplary implementation of the scene 112 of FIG. 1. Therefore, the descriptions of the first vehicle 302, the audio control device 306, the first audio reproduction device 308A, the second audio reproduction device 308B, the first sensor 310A, the second sensor 310B, and the third sensor 310C are omitted from the disclosure for the sake of brevity. The scene 312 or the physical space 304 shown in the first scenario 300A may further include a user 314, mountains 316, and grass 318, as an exemplary implementation of the plurality of objects 114 of FIG. 1. It may be noted that the user 314, the mountains 316, and the grass 318 shown as the plurality objects 114 in FIG. 3A are merely for exemplary purposes. The first scenario 300A may include other types of the plurality of objects 114, without any deviation from the scope of the disclosure. In an embodiment, the user 314 may be an occupant of the first vehicle 104 who may be standing or moving in the physical space 304 outside the first vehicle 104. The user 314 may be listening to audio content being played or controlled by the audio control device 306 with either of doors or windows of the first vehicle 104 opened.

The control circuitry 202 may configured to receive one or more signals from the first sensor 310A, the second sensor 310B, and/or the third sensor 310C in-built in the first vehicle 302. In other words, the control circuitry 202 may be configured to receive an object detection signal in the form an electrical or digital signal from the one or more sensors (e.g., the first sensor 310A, the second sensor 3106, and the third sensor 310C). The one or more signals may correspond to a detection of the plurality of objects 114 (e.g., the user 314, the mountains 316, and the grass 318) present in the physical space 304 surrounding the first vehicle 302. In embodiment, the audio control device 306 may activate the one or more sensors based on detection of one or more factors, such as (but not limited to) current playback of the audio content and window/doors of the first vehicle 302 open/down.

In an example, the first sensor 310A, the second sensor 310B, and the third sensor 310C may correspond to an image capturing device, a proximity sensor, and a LIDAR sensor, respectively. It may be noted that the image capturing device, the proximity sensor, and the LIDAR sensor that may correspond to the first sensor 310A, the second sensor 310B, and the third sensor 310C, respectively, in FIG. 3A is merely an example. The first scenario 300A may include other types of the one or more sensors, without any deviation from the scope of the disclosure. In an embodiment, all the first sensor 310A, the second sensor 310B, and the third sensor 310C positioned at different surface of the first vehicle 302 are image capturing devices (such as camera).

The first sensor 310A (such as, the image capturing device) may include suitable logic, circuitry, and/or interfaces that may be configured to capture an image or a plurality of images of the physical space 304. The first sensor 310A may be further configured to detect the plurality of objects 114 present in the physical space 304 based on the captured image or the plurality of images. The first sensor 310A may be further configured to determine the scene 312 of the physical space 304 based on detection of the plurality of objects 114 in the captured image. In some embodiments, the first sensor 310A may provide the captured images, as the object detection signal or data, to the control circuitry 202. The control circuitry 202 may detect the plurality of objects 114 in the received images based on different image processing techniques, such as, but not limited to, face detection algorithms, object detection algorithms, deep learning algorithms, and other image processing algorithms. Examples of the first sensor 310A may include, but are not limited to, an image sensor, a wide-angle camera, an action camera, a closed-circuit television (CCTV) camera, a camcorder, a digital camera, 360 degree camera, a time-of-flight camera (ToF camera), a night-vision camera, and/or other image capture devices. For example, in the first scenario 300A of FIG. 3A, the control circuitry 202 may detect the plurality of objects 114 in the physical space 304 as the user 314 (i.e. which may be a driver or passenger of the first vehicle 302), the mountains 316, and the grass 318 based on the images received from the first sensor 310A.

The second sensor 310B (such as, the proximity sensor) may include suitable logic, circuitry, and/or interfaces that may be configured to detect the plurality of objects 114 (or presence of objects) in the physical space 304 surrounding the first vehicle 302. The second sensor 3106 may generate the object detection signal, when the plurality of objects may be in proximity of the first vehicle 302. The second sensor 310B may be further configured to provide the generated object detection signal to the control circuitry 202 for the detection of the plurality of objects 114. Examples of the second sensor 3106 may include, but are not limited to, a sound sensor, a light sensor, an infrared (IR) sensor, a photoelectric sensor, or an ultrasonic sensor.

The third sensor 310C (such as, the LIDAR sensor) may include suitable logic, circuitry, and/or interfaces that may be configured to detect the plurality of objects 114 in the physical space 304 surrounding the first vehicle 302. The third sensor 310C may generate the object detection signal, when the plurality of objects may be in proximity of the first vehicle 302. The third sensor 310C may be further configured to provide the generated object detection signal to the control circuitry 202 for the detection of the plurality of objects 114 using laser signals produced by the third sensor 310C. The control circuitry 202 may be configured to count a time of return of electrical or digital pulses (or signals) received from the third sensor 310C to detect the plurality of objects 114.

In an embodiment, the control circuitry 202 may apply an object detection or recognition model on the received one or more signals, to detect or recognize the plurality of objects 114 present in the physical space 304 surrounding the first vehicle 302. The object detection model may be a pre-trained machine learning (ML) model that may be trained to detect or recognize one or more objects in a physical space surrounding a vehicle based on one or more signals that may be received from the one or more sensors of the vehicle. The object detection model may be pre-trained on a training dataset of different object types typically present in the physical space surrounding the vehicle. The object detection model may be defined by its hyper-parameters, for example, number of weights, cost function, input size, number of layers, and the like. The hyper-parameters of the object detection model may be tuned and weights may be updated before or while training the object detection model on the training dataset so as to identify a relationship between inputs, such as features in a training dataset and output labels, such as e.g., a first person (e.g., the user 314), a second vehicle different from the first vehicle, or a first obstacle to the first vehicle 302. After several epochs of the training on the features in the training dataset, the object detection model may be trained to output a prediction/ classification result for a set of inputs (like object detection signals like captured one or more images of the physical space 304). The prediction result may be indicative of a class label (such as the user 314, the mountains 316, grass 318 in FIG. 3A) for each input of the set of inputs.

In an embodiment, the object detection model may include electronic data, such as, for example, a software component of an application executable on the audio control device 306. The object detection model may rely on libraries, external scripts, or other logic/instructions for execution by a processing device, such as the audio control device 306. The object detection model may include computer-executable codes or routines to enable a computing device, such as the audio control device 306 to perform one or more operations to detect the plurality of objects based on the received one or more signals, or to determine the scene 312 based on the detected plurality of objects. Additionally or alternatively, the object detection model may be implemented using hardware including a processor, a microprocessor (e.g., to perform or control performance of one or more operations), a field-programmable gate array (FPGA), or an application-specific integrated circuit (ASIC). In some embodiments, the object detection model may be implemented using a combination of hardware and software. Examples of the object detection model may include, but is not limited to, a neural network model or a model based on one or more of regression method(s), instance-based method (s), regularization method(s), decision tree method(s), Bayesian method(s), clustering method(s), association rule learning, and dimensionality reduction method(s).

Examples of the neural network model that may be used for the object detection may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the neural network model may include numerical computation techniques using data flow graphs. In certain embodiments, the neural network model may be based on a hybrid architecture of multiple Deep Neural Networks (DNNs).

The control circuitry 202 may be configured to determine a scene (e.g., the scene 312) of the physical space 304 surrounding the first vehicle 302, based on the plurality of objects 114 (e.g., the user 314, the mountains 316, and the grass 318) detected from the received one or more signals from the one or more sensors associated with the first vehicle 302. The control circuitry 202 may determine the scene 312 based on the detected plurality of objects 114 from the received one or more signals based on different image processing techniques, such as, but not limited to, object detection algorithms, deep learning algorithms, and other image processing algorithms. For example, in the first scenario 300A in FIG. 3A, the control circuitry 202 may determine the scene 312 as a scenery scene based on the detected plurality of objects 114, such as the mountains 316 and the grass 318.

In an embodiment, the control circuitry 202 may be configured to apply the object detection model to determine the scene 312 of the physical space 304 surrounding the first vehicle 302, based on the detected plurality of objects 114. The scene 312 may be an environmental context of the physical space 304 surrounding the first vehicle 302 that may include each of the plurality of objects 114. Examples of the scene 312 may include, but are not limited to a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene. In an example, the day scene may include objects such as, but not limited to, sun. Further, an image that may include the day scene may be of a high or medium brightness due to sunlight. In another example, the night scene may include objects such as, but not limited to, moon, stars. Further, an image that may include the night scene may be of a low brightness. In some embodiments, a light sensor (not shown) of the first vehicle 302 may be used by the audio control device 306 to detect an ambient light or brightness around the first vehicle 302 to determine the day scene or the night scene. In yet another example, the party scene may include objects such as, but not limited to, one or more persons, decorative items, food items, and combination. In another example, the scenery scene may include objects such as, but not limited to, mountains, river, valley, and grass. In yet another example, the sports scene may include objects such as, but not limited to, one or more people, sports related objects (e.g. football) or other sports equipment, and chairs or other seating arrangement for audience. In another example, the garden scene may include detected plurality of objects such as, but not limited to pathway/side-walk, one or more persons, trees, grass, or other garden related objects (such as lawn mower machine).

In accordance with an embodiment, the control circuitry 202 may be further configured to determine a distance (e.g., the distance 'D') between a first object (e.g., the user 314) of the detected plurality of objects 114 and the first vehicle 302, based on the received one or more signals. The control circuitry 202 may be configured to analyze the received one or more signals to determine the distance 'D'. For example, when the one or more signals are received from the LIDAR sensor, the RADAR sensor, or the SONAR sensor, the control circuitry 202 may be configured to determine the distance (e.g., the distance 'D') based on a time taken by each signal to travel to-and-fro between the corresponding sensor of the first vehicle 302 and the first object (e.g., the user 314). In an embodiment, the control circuitry 202 may be configured to determine the distance (e.g., the distance 'D') between the user 314 and the first vehicle 302 based on, for example, Time-of-Arrival (TOA) measurements of the one or more signals received from one or more of the LIDAR sensor, the RADAR sensor, or the SONAR sensor. The TOA measurement may correspond to a time taken by a signal to reach the one or more sensors (e.g., the third sensor 310C) associated with the first vehicle 302 as after the reflection from a detected object, such as, the user 314. Based on the speed of the signal (e.g., a sound signal in case of SONAR) and the TOA measurement, the control circuitry 202 may determine the distance between the user 314 of the detected plurality of objects 114 and the first vehicle 302. As an example, the distance between the user 314 of the detected plurality of objects 114 and the first vehicle 302 may be determined as a distance 'D', as shown in FIG. 3A. In some embodiments, the control circuitry 202 may determine the distance between the user 314 (as one of the detected plurality of objects 114) and the first vehicle 302 based on the one or more images captured by the image capturing device (for example the first sensor 310A in case a field-of-view (FOV) of the first sensor 310A includes the user 314). The control circuitry 202 may recognize the detected user 314 as the occupant of the first vehicle 302 based on sample images of the user 314 stored in the memory 204. In accordance with an embodiment, the control circuitry 202 may continuously or periodically (say in every few milliseconds, seconds or minutes) control the one or more sensors to determine the scene 312 and the distance (distance 'D') such that the audio control device 306 may dynamically control the audio reproduction of the audio content based on change in the determined scene 312 and the determined distance (distance 'D') on run-time basis.

In accordance with an embodiment, the control circuitry 202 may be further configured to adjust one or more audio parameters associated with the one or more audio reproduction devices 308A-308B of the first vehicle 302. The adjustment of the one or more audio parameters may be based on the determined scene 312 of the physical space 304 surrounding the first vehicle 302 and the determined distance 'D' between the first object (e.g., the user 314) and the first vehicle 302. The one or more audio parameters may correspond to audio characteristics of a first audio output to be reproduced (or being reproduced) by the one or more audio reproduction devices 308A-308B. Examples of the one or more audio parameters may include, but are not limited to, a volume setting, a frequency setting, an equalization mode, an activation status of the one or more audio reproduction devices 308A-308B, or a directionality of an audio reproduced by the one or more audio reproduction devices 308A-308B. For example, the volume setting may indicate a value of an amplitude or a level of the volume (in dB). For example, in case the distance 'D' is greater than a threshold distance and the determined scene 312 is a scenery scene (e.g., in case of the first scenario 300A), the audio control device 306 may amplify the volume of the one or more audio reproduction devices 308A-308B for reproduction of the first audio output. In another example, if the distance 'D' is less than the threshold distance and the determined scene 312 is a parking lot scene (e.g., in case of a third scenario 300C of FIG. 3C) or road scene (e.g., in case of a fourth scenario 300D of FIG. 3D), the audio control device 102 may attenuate a volume of the one or more audio reproduction devices 308A-308B for reproduction of the first audio output. In accordance with an embodiment, in case of any change in the determined distance 'D' between the first object (e.g. the user 314) and the first vehicle 302, the audio control device 306 accordingly adjust the volume (i.e. audio parameter) of the one or more audio reproduction devices 308A-308B. Thus, in case the user 314 moves away from the first vehicle 302, the volume of the reproduced first audio output increases, and in case the user 314 comes closer to the first vehicle 302, the volume of the reproduced first audio output decrease. Therefore, the disclosed audio control device 306 maintains an optimum volume or sound effect of the reproduced first audio output even if the user 314 (i.e. occupant of the first vehicle 302) moves in the physical space 304 around the first vehicle 302. In another example, the frequency setting may indicate a value of a frequency or a frequency range (in Hz). In yet another example, the equalization (EQ) mode (e.g., a parametric EQ) may indicate the frequency range or a center frequency, (which has to be equalized to a particular amplitude/gain level), a sharpness (also referred as Q factor) of the frequency range or center frequency, and a level control (which may indicate an amplitude value by which the frequency range or the center frequency is to be boosted or reduced). For example, in case the distance 'D' is greater than the threshold distance and the determined scene 314 is a party scene or a dance scene, the audio control device 306 may boost low frequencies (e.g., 20 to 60 Hz) associated with the frequency setting/EQ mode of the one or more audio reproduction devices 308A-308B for reproduction of the first audio output. The low frequency sound may be audible from a greater distance. Further, the boosting of the low frequency sound may enhance audio output of low pitched drums in the first audio output, which may be desirable in the party scene or the dance scene. In another example, if the distance 'D' is less than the threshold distance and the determined scene 312 is a parking lot scene, the audio control device 102 may reduce the amplitude or gain of upper mid-range frequencies (e.g., 2 KHz to 6 KHz) associated with the frequency setting/EQ mode of the one or more audio reproduction devices 308A-308B for reproduction of the first audio output. Upper mid frequency sound may be damaging to human ears, especially at nearer distances. Further, the parking lot scene may restrict high frequency sound like horns. Hence, reduction of the amplitude or gain the of upper midrange frequency sound may reduce distortions in the first audio output, which may be desired at nearer distances and in the parking lot scene.

In another example, the activation status of the one or more audio reproduction devices 308A-308B may indicate whether the first audio reproduction device 308A and the second audio reproduction device 308B is turned on or is turned off. As shown in FIG. 3A, the first audio reproduction device 308A may be present on a left side within the first vehicle 302 and the second audio reproduction device 308B may be present on a right side within the first vehicle 302. In an example, in case the user 314 may be detected on a left side of the first vehicle 302 based on the object detection signals provided by the one or more sensors (such as the first sensor 310A), the audio control device 306 may control the first audio reproduction device 308A to be activated (i.e., turned on) and control the second audio reproduction device 308B to be deactivated (i.e., turned off) for reproduction of the first audio output. This may prevent unnecessary usage of a battery or fuel (in case, an engine may be powered on) of the first vehicle 302 by activation of audio reproduction device(s) that may not be required for the reproduction of the first audio output. In yet another example, the directionality of an audio reproduced by the one or more audio reproduction devices 308A-308B may indicate a direction, with respect to the first vehicle 302, in which the audio output of the one or more audio reproduction devices 308A-308B may be focused. In an example, in case the user 314 may be approaching from the left side of the first vehicle 302, the audio control device 306 may control the one or more audio reproduction devices 308A-308B to reproduce the first audio output towards the left side of the first vehicle 302. To reproduce the first audio output towards the left side of the first vehicle 302, the audio control device 306 may activate (or turn on) the first audio reproduction device 308A and deactivate (or turn off) the second audio reproduction device 308B. Again, this may prevent unnecessary usage of the battery or fuel (in case, the engine may be powered on) of the first vehicle 302 by activation of audio reproduction device(s) that may not be required for the reproduction of the first audio output. The control circuitry 202 may be further configured to store the one or more audio parameters in the memory 204 in the form of a look up table, as described, for example, in FIG. 4. In some embodiments, the first audio reproduction device 308A and the second audio reproduction device 308B may be mounted on a rotatory surface or part of the first vehicle 104. Based on the detected movement of the user 314 in three-dimensional (3D) space, the control circuitry 202 may control the rotatory movement (for example in 360-degree movement) of the first audio reproduction device 308A or the second audio reproduction device 308B to control the directionality of the first audio output reproduced or to be reproduced through the first audio reproduction device 308A or the second audio reproduction device 308B. In some embodiments, the roof of the first vehicle 302 may include a rail or track (not shown) on which the first audio reproduction device 308A or the second audio reproduction device 308B may move in two-dimensional space. The control circuitry 202 may control the movement of one of the first audio reproduction device 308A or the second audio reproduction device 308B over the rail to dynamically control the directionality of the first audio output based on the detected movement of the user 314 around the first vehicle 302. Such movable structure (in 2D or 3D) of the audio reproduced devices may control the number of audio reproduced devices required in the first vehicle 302 to optimally control the audio reproduction of the first audio output based on the 2D or 3D movement of the user 314.

The control circuitry 202 may be further configured to control the one or more audio reproduction devices 308A-308B to reproduce the first audio output based on the adjusted one or more audio parameters associated with the one or more audio reproduction devices 308A-308B. In other words, the control circuitry 202 may apply the adjusted one or more audio parameters to the one or more audio reproduction devices 308A-308B for reproduction of the first audio output with a defined response (for example, a flat response or an ideal speaker response). This may provide optimum audio experience to the user 314 in the physical space 304 surrounding the first vehicle 302 even if the user 314 may be moving around the first vehicle 302. Based on the adjusted one or more audio parameters (such as volume, equalization, activation/deactivation of audio reproduction devices, or directionality), the first audio reproduction device 308A and the second audio reproduction device 308B may reproduce the first audio output for the determined scene 312 and the determined distance of the first user from the first vehicle 302. Thus, the disclosed audio control device 306 may enable the user 314 (while walking, landscaping, or working around the first vehicle 302) in the physical space 304 surrounding the first vehicle 302 to experience an audio output of a consistent level even at varying distances from the first vehicle 302. Therefore, the audio control device 306 may enable the user 314 (such as an occupant of the first vehicle 302) to have an optimum audio experience in the physical space 304 surrounding the first vehicle 302, such that the user 314 may not miss any part of the first audio output even when the user 314 may be slightly away from the first vehicle 302. The reproduction of the first audio output is further described, for example, in FIG. 3D.

Figure 3B:
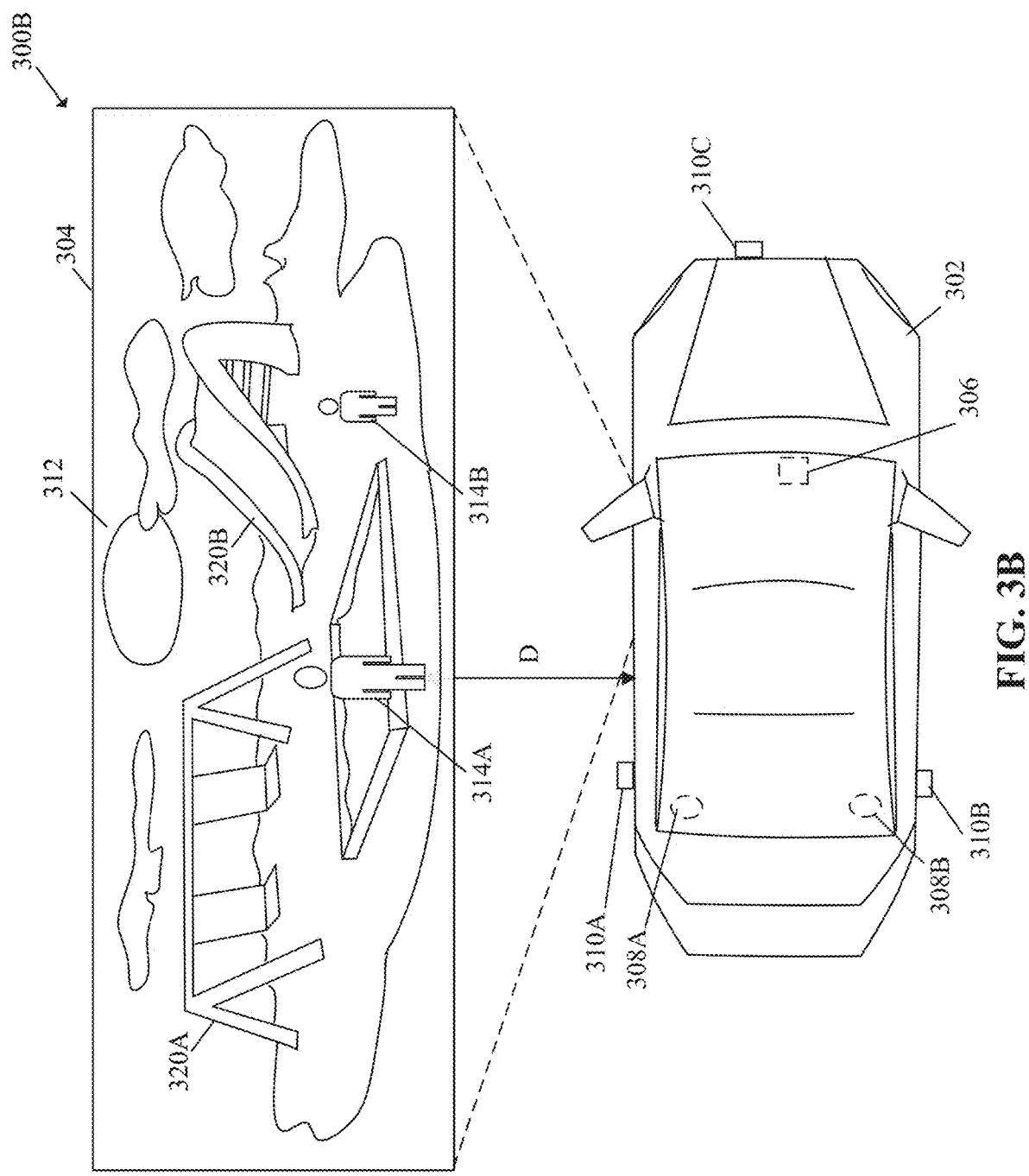

With reference to FIG. 3B, there is shown an exemplary second scenario 300B. In the second scenario 300B, there is shown the first vehicle 302 and the physical space 304 (for example a playground or a garden) close to or surrounding the first vehicle 302 (as described, for example, in FIG. 3A). Similar to FIG. 3A, the first vehicle 302 may include the audio control device 306, the one or more audio reproduction devices 308A-308B, and the one or more sensors 310A-310C. As shown in FIG. 3B, there is shown a first user 314A, a second user 314B, a plurality of swings 320A-320B. The control circuitry 202 may detect the plurality of objects 114 in the physical space 304 as the first user 314A, the second user 314B, the plurality of swings 320A-320B based on the one or more signals received from the one or more sensors 310A-310C, as described in FIG. 3A. Further, the control circuitry 202 may determine the scene 312 as a playground scene based on the detected plurality of objects 114 such as, the plurality of swings 320A-320B.

The control circuitry 202 may be configured to determine the scene 312, determine the distance 'D', adjust the one or more audio parameters, and control the one or more audio reproduction devices (such as, the first audio reproduction device 308A, and the second audio reproduction device 308B) to reproduce the first audio output based on the adjusted one or more audio parameters, as described for example, in FIG. 3A. For example, based on the determined scene 312 (such as the playground scene), the control circuitry 202 may increase the volume (i.e. audio parameter) of the first audio output.

Figure 3C:
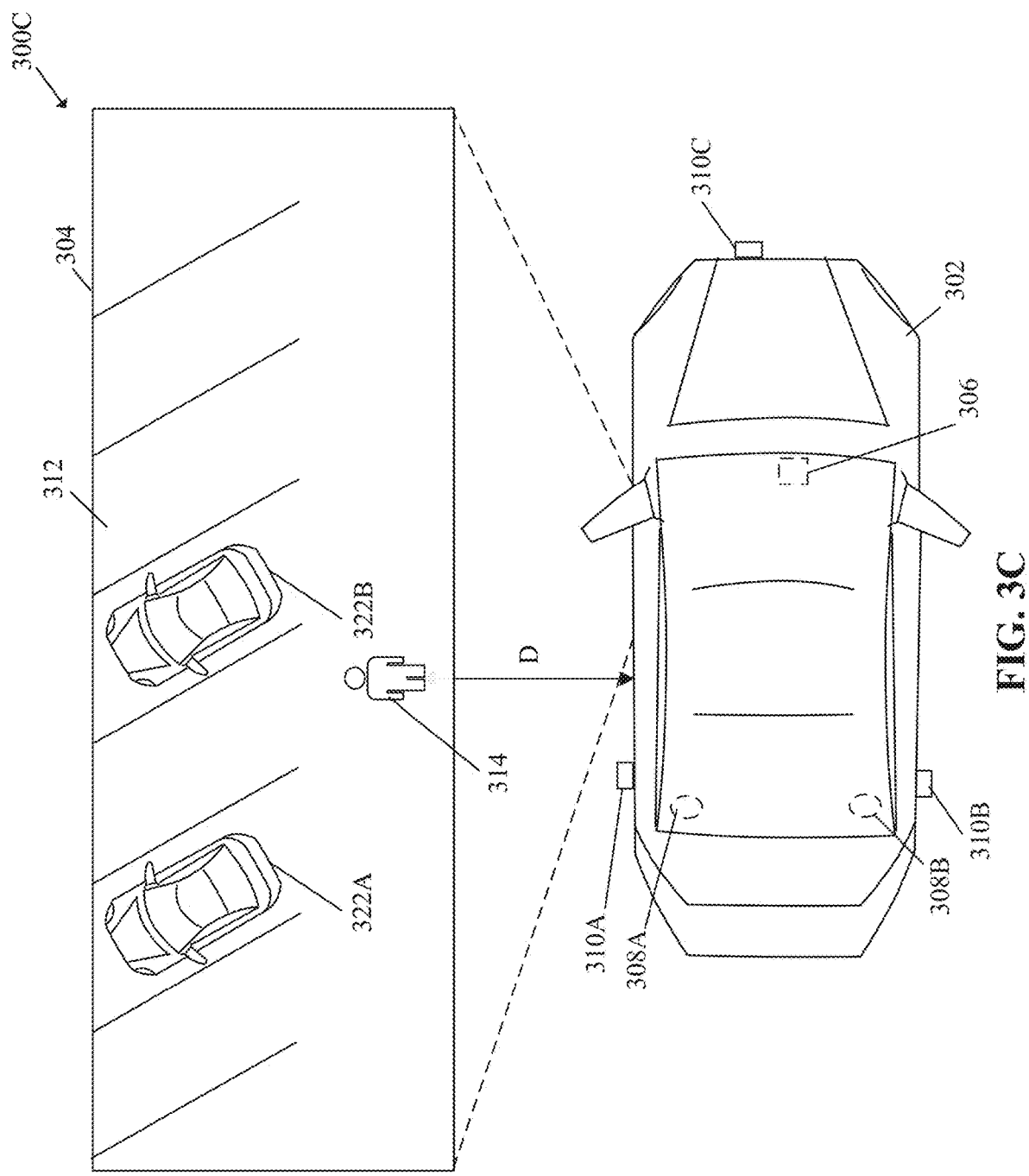

With reference to FIG. 3C, there is shown an exemplary third scenario 300C. In the third scenario 300C, there is shown the first vehicle 302 and the physical space 304 surrounding the first vehicle 302 (as described, for example, in FIG. 3A). Similar to FIG. 3A, the first vehicle 302 may include the audio control device 306, the one or more audio reproduction devices 308A-308B, and the one or more sensors 310A-310C. As shown in FIG. 3C, there is shown the user 314, a second vehicle 322A, and a third vehicle 322B. The control circuitry 202 may detect the plurality of objects 114 in the physical space 304 as the second vehicle 322A, and the third vehicle 322B in a still position based on the one or more signals received from the one or more sensors 310A-310C. Further, the control circuitry 202 may determine the scene 312 as a parking lot scene based on the detected plurality of objects 114 such as, the user 314, the second vehicle 322A, and the third vehicle 322B.

The control circuitry 202 may be configured to determine the scene 312, determine the distance 'D', adjust the one or more audio parameters, and accordingly control the one or more audio reproduction devices (such as, the first audio reproduction device 308A, and the second audio reproduction device 308B) to reproduce the first audio output based on the adjusted one or more audio parameters, as described for example, in FIG. 3A. For example, based on the determination of the scene 312 as the parking lot scene, the control circuitry 202 may reduce the set volume (i.e. audio parameter) of the one or more audio reproduction devices, and further increase/decrease the volume (over the set volume as per the determined scene) based on the change in the determined distance 'D' between the user 314 and the first vehicle 302.

Figure 3D:
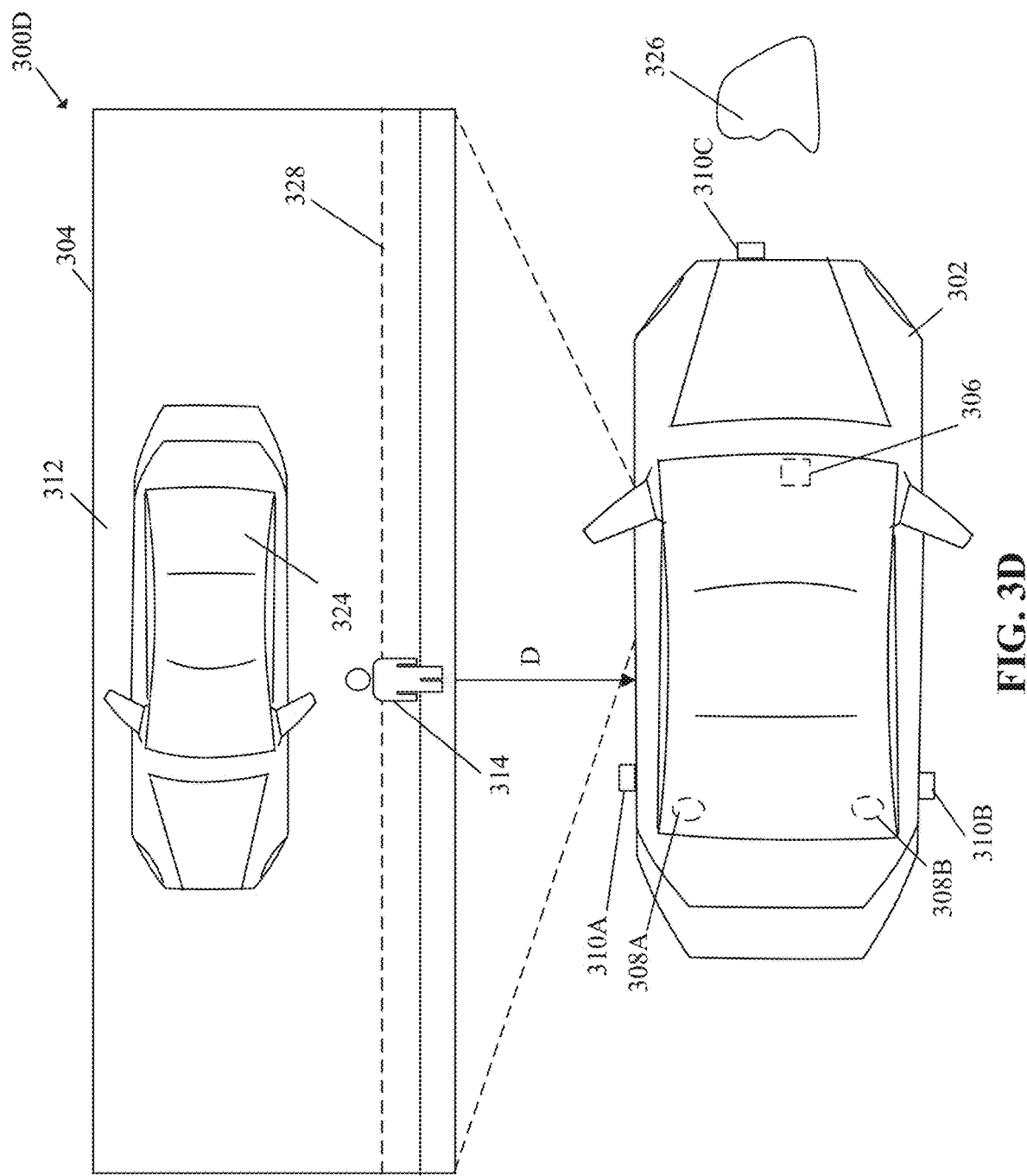

With reference to FIG. 3D, there is shown an exemplary fourth scenario 300D. In the fourth scenario 300D, there is shown the first vehicle 302 and the physical space 304 surrounding the first vehicle 302 (as described, for example, in FIG. 3A). Similar to FIG. 3A, the first vehicle 302 may include the audio control device 306, the one or more audio reproduction devices 308A-308B, and the one or more sensors 310A-310C. As shown in FIG. 3D, there is shown the user 314 (such as an occupant of the first vehicle 302), a second vehicle 324, an obstacle 326, and a road portion 328. The second vehicle 324 and the user 314 may lie on the road portion 328. The control circuitry 202 may detect the plurality of objects 114 in the physical space 304 as the user 314, the second vehicle 324, the obstacle 326, and the road portion 328 based on the one or more signals received from the one or more sensors 310A-310C as described, for example, in FIG. 3A.

The control circuitry 202 may be configured to determine the scene 312 (for example as a road scene), determine the distance 'D', adjust the one or more audio parameters, and control the one or more audio reproduction devices (such as, the first audio reproduction device 308A, and the second audio reproduction device 308B) to reproduce the first audio output based on the adjusted one or more audio parameters, as described for example, in FIG. 3A. For example, based on the determined road scene, the audio control device 306 may increase the set volume (i.e. audio parameter) for the first audio output to be reproduced by the one or more audio reproduction devices.

In an embodiment, the control circuitry 202 may be configured to classify the first object 114A as a first person (such as, the user 314), a second vehicle (such as, the second vehicle 324) different from the first vehicle 302, or a first obstacle (such as, the obstacle 326). The control circuitry 202 may be configured to classify the first object 114A using various techniques, that may include, but are not limited to, a machine learning technique, an object detection technique, or a neural network as described, for example, in FIG. 3A.

The control circuitry 202 may be further configured to control the one or more audio parameters of the one or more audio reproduction devices based on the classification of the first object 114A. In an example, the first person (e.g., the user 314) may be one of: a pedestrian, an owner of the first vehicle 302 or any other occupant of the first vehicle 302 who may be located in the physical space 304 surrounding the first vehicle 302. The control circuitry 202 may be configured to adjust the volume setting, or the frequency setting based on the location of the first person (e.g., the user 314) in the physical space 304 surrounding the first vehicle 302. For example, the volume may be increased if the first person (e.g., the user 314) may be located beyond a certain threshold distance (or moves away) from the first vehicle 302, and the volume may be decreased if the first person (e.g., the user 314) may be located within the threshold distance from the first vehicle 302 (or the user 314 moves closer to the first vehicle 302). The control circuitry 202 may thereby adjust the volume of the one or more audio reproduction devices 308A-308B such that the first audio output that may be reproduced by the one or more audio reproduction devices 308A-308B may be clearly audible to the first person (e.g., the user 314) and yet not be unpleasantly loud to hear. The dynamic adjustment of the volume may also conserve the battery or fuel (in case, an engine of the first vehicle 302 is on) that may be used to operate the one or more audio reproduction devices 308A-308B.

In an embodiment, when the first object corresponds to the first person (e.g., the user 314), the control circuitry 202 may be configured to adjust the one or more audio parameters based on anatomy of a human being. For example, the memory 204 may store an association of a height (e.g., a height level of ears) of the first person and corresponding adjustments of the one or more audio parameters. This may allow the control circuitry 202 to reproduce the first audio output based on a three-dimensional location of the ears or head of the first person in the physical space 304. For example, the control circuitry 202 may control a directionality of the first audio output reproduced by the one or more audio reproduction devices 308A-308B based on a distance (and location) of the first person and the height of the first person with respect to the first vehicle 302. This may focus the reproduced first audio output towards the ears or head of the first person, and thus may enhance the listening experience of the first person around the first vehicle 302. The audio control device 306 may determine the three-dimensional location of the head or the ears of the first person based on images captured by the one or more sensors (for example image capturing device). Thus, the audio control device 306 may adjust the one or more audio parameters (for example directionality or other parameters) of the one or more audio reproduction devices 308A-308B based on different heights of people detected in the physical space 304 surrounding the first vehicle 302.

In another example, the second vehicle (e.g., the second vehicle 324 detected as the first object 114A) may correspond to any two-wheeler, three-wheeler, four-wheeler or a vehicle with more than four wheels. The control circuitry 202 may be configured to adjust the activation status of the one or more audio reproduction devices 308A-308B, or the directionality of the first audio output reproduced by the one or more audio reproduction devices 308A-308B for the classification of the detected first object 114A as the second vehicle 324. The adjustment of the activation status or the directionality may be based on a location or direction of movement of the second vehicle (e.g., the second vehicle 324) in the physical space 304 surrounding the first vehicle 302. In yet another example, the first obstacle (e.g., the obstacle 326 detected as the first object 114A) to the first vehicle 302 may correspond to any obstruction that may be located in the physical space 304 surrounding the first vehicle 302. In such case, the control circuitry 202 may be configured to adjust the activation status of the one or more audio reproduction devices 308A-308B or adjust the directionality of the first audio output reproduced by the one or more audio reproduction device 308A-308B. For example, the control circuitry 202 may be configured to deactivate an audio reproduction device towards the direction of the obstacle, as the first audio output may not be required to be reproduced for an obstacle. Again, such deactivation may lead to conservation of the battery or the of the first vehicle 302. In another example, in case the obstacle 326 is recognized as animate object (for example any animal), the audio control device 306 may control the one or more audio reproduction devices 308A-308B to reproduce a high pitch tone for the obstacle 326.

In an embodiment, the control circuitry 202 may be further configured to determine a three-dimensional (3D) location of the first object 114A (shown in FIG. 1) or the user 314 (shown in FIGS. 3A-3D) in the physical space 304 surrounding the first vehicle 302 based on the one or more signals received from the one or more sensors 310A-310C. The 3D location of the first object 114A may correspond to a 3D position of the first object 114A (or head of an occupant of the first vehicle 302) in the physical environment. The 3D position may include 3D coordinates of the first object 114A in the physical space 304, that may be indicative of a position and direction of the first object 114A with respect to the first vehicle 302. The control circuitry 202 may be further configured to adjust the one or more audio parameters of the one or more audio reproduction devices 308A-308B based on the determined 3D location of the first object 114A. For example, the control circuitry 202 may adjust the volume of the one or more audio reproduction devices 308A-308B based on a distance (i.e., a 2D location) of the first object 114A from the first vehicle 302, and/or adjust a directionality of the first audio output reproduced from the one or more audio reproduction device 308A-308B based on a direction and height of the first object 114A. This may further provide a better audio listening experience for the user 314 (for example the occupant of the first vehicle 302) moving in different 3D locations around the first vehicle 302.

In an embodiment, the control circuitry 202 may be further configured to adjust an activation status of a first audio reproduction device (e.g., the first audio reproduction device 308A) from the one or more audio reproduction devices 308A-308B based on the determined three-dimensional location of the first object. For example, the determined 3D location of the first object 114A may be towards a left side of the first vehicle 302. In such case, the control circuitry 202 may be configured to activate the first audio reproduction device 308A that may be present on the left side of the first vehicle 302 and deactivate a second audio reproduction device (e.g., the second audio reproduction device 308B) that may be present on the left side of the first vehicle 302.

In an embodiment, the control circuitry 202 may be further configured to adjust a directionality of an audio reproduced by the one or more audio reproduction devices 308A-308B based on the determined 3D location of the first object 114A. For example, in case the determined 3D location of the first object 114A is toward a left side of the first vehicle 302, the control circuitry 202 may be configured to control the directionality of the first audio output reproduced by the first audio reproduction device (e.g., the first audio reproduction device 308A) that may be on a left side of the first vehicle 302. Further, the control of the directionality of the reproduced first audio output by the one or more audio reproduction devices 308A-308B based on three-dimensional movement of the first object 114A (or the user 314) is described, for example, in FIG. 3A.

In an embodiment, the control circuitry 202 may be further configured to determine the first audio output based on the determined scene 312 of the physical space 304 surrounding the first vehicle 302. The determined scene 312 may correspond to at least one of a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene. For example, the control circuitry 202 may be determine the first audio output as a "Soothing Music" for a scenery scene or a day scene, a "Motivational Music" for a sports scene or a playground scene, an "Instrumental Music" for a night scene, or a romantic scene, and a "Dance music" for a party scene or a dance scene.

In certain scenarios, the first output audio output may be an audio output of a user-selected audio content for reproduction by the one or more audio reproduction devices 308A-308B. For example, the control circuitry 202 may be configured to receive a user input indicative of a selection of the audio content for reproduction of the first audio output, via the I/O device 206. The control circuitry 202 may be configured to control the one or more audio reproduction device 308A-308B to reproduce the first audio output based on the received user input.

In an embodiment, the control circuitry 202 may be further configured to receive an audio signal from an electronic apparatus (e.g., the electronic apparatus 116 shown in FIG. 1) associated with the first object 114A. The control circuitry 202 may be configured to control the one or more audio parameters of the one or more audio reproduction devices 308A-308B based on the received audio signal from the electronic apparatus 116. For example, the control circuitry 202 may transmit a signal or command to the electronic apparatus 116 to capture of the audio signal (i.e. first audio output) reproduced by the one or more audio reproduction devices 308A-308B associated with the first vehicle 302. The electronic apparatus 116 may include an audio capturing device (not shown) which may capture the audio signal being received near to the user 314 (or the first object 114A) associated with the electronic apparatus 116. Examples of the audio capturing device may include, but are not limited to, a recorder, an electret microphone, a dynamic microphone, a carbon microphone, a piezoelectric microphone, a fiber microphone, a micro-electro-mechanical-systems (MEMS) microphone, or other microphones. The electronic apparatus 116 may transmit the captured audio signal to the audio control device 306, via the communication network 118 (shown in FIG. 1). The audio signal may be transmitted to the audio control device 102 for comparison with the first audio output reproduced by the one or more audio reproduction devices 308A-308B based on the adjusted one or more audio parameters. The control circuitry 202 may perform the comparison to check a presence of a noise signal (i.e. ambient noise) in the reproduced first audio output captured by the audio capturing device of the electronic apparatus 116 (for example mobile phone) of the user 314. The control circuitry 202 may be configured to provide noise-based adjustments of the one or more audio parameters based on the received audio signal from the electronic apparatus 116. The control circuitry 202 may provide noise cancellation (i.e. noise-based adjustments) on the reproduced first audio output based on the received audio signal (or based on the comparison) such that the user 314 may experience high quality o sound reproduction in the physical space 304 around the first vehicle 302.

In an embodiment, the control circuitry 202 may be further configured to transmit a notification signal (or alert) to an electronic apparatus (e. g., the electronic apparatus 116) associated with the first object 114A (shown in FIG. 1). The first object 114A may be another vehicle (such as the second vehicle 324) which may be located or moving near to the first vehicle 302. In an embodiment, the first object 114A may be another person (such a pedestrian) standing/moving in the physical space 304 around the first vehicle 302. The notification signal may include, but is not limited to, an audible alert, or a visual alert, or any other alert signal. The notification signal may be indicative of one or more operations associated with the first vehicle 302. The one or more operations associated with the first vehicle 302 may include, but are not limited to, a turning of the first vehicle 302, a breaking of the first vehicle 302, or a reversing of the first vehicle 302. For example, the control circuitry 202 may be configured to alert the first object 114A (e.g., a first person, or the second vehicle 324, through the electronic apparatus 116 associated with the second vehicle 324, about the one or more operations associated with the first vehicle 302.

In an embodiment, the first object 114A may correspond to a first person (such as the occupant of the first vehicle 302), and the control circuitry 202 may be configured to receive hearing information of the first person from an electronic apparatus (e.g., the electronic apparatus 116) associated with the first person. The hearing information may indicate a listening ability or disability of the first person (i.e. user 314). The control circuitry 202 may be further configured to control the one or more audio parameters of the one or more audio reproduction devices 308A-308B based on the received hearing information. For example, if the first person has a hearing disability the volume of the one or more audio reproduction devices 308A-308B may be increased such that the increased volume may be higher than a volume that may be set for a person with normal hearing ability. In some embodiments, the control circuitry 202 may be configured to receive an input indicative of the hearing information of the first person, via the I/O device 206 of the audio control device 306. Based on the received input, the control circuitry 202 may control the one or more audio parameters of the one or more audio reproduction devices 308A-308B. The memory 204 may be further configured to store the hearing information of the first person (i.e. occupant of the first vehicle 302) and the adjusted one or more audio parameters of the one or more audio reproduction devices 308A-308B corresponding to the first person for future audio reproduction as per the hearing ability of the first person.

FIG. 4 is a table that illustrates exemplary data which indicates associations between scenes of a physical space surrounding the vehicle, distance between objects and the vehicle, and one or more audio parameters for the audio control, in accordance with an embodiment of the disclosure. FIG. 4 is explained in conjunction with elements from FIGS. 1, 2, 3A, 3B, 3C, and 3D. With reference to FIG. 4, there is shown a table 400. The table 400 may include columns such as, a determined scene 402, a determined distance 404, one or more audio parameters 406, and an audio output 408. As shown in FIG. 4, the table 400 (such as lookup-table) may include multiple rows, where each row may correspond to an association between the determined scene 402, the determined distance 404, the one or more audio parameters 406, and the audio output 408. In an embodiment, the one or more audio parameters 406 may include (but is not limited to) a volume setting 406A, and a frequency setting 406B.

In an embodiment, the one or more audio parameters 406 (such as, the volume setting 406A, and the frequency setting 406B) may be varied for a particular determined scene 402 and based on the determined distance 404. As shown in the table 400 of FIG. 4, for example, the determined scene 402 may correspond to "Scenery Scene", "Playground Scene", "Parking lot Scene", and "Party Scene". The determined scene 402 may correspond to an environmental context associated with the physical space 106 surrounding the first vehicle 104. Example of the determined scene 402 may include, but are not limited to, a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene. As shown in the table 400, a scenery scene, a playground scene, a parking lot scene, and a party scene are provided as exemplary row values for the determined scene 402. Further, the determined distance 404 may include values (such as, "A1", "A2", "B1", "B2", "C1", "C2", "D1", and "D2" in one of centimeter, inches, feets, or meters), as shown in various rows of the table 400. The determined distance 404 may correspond to the distance 'D' between the first object 114A (such as, a person, or an obstruction) and the first vehicle 104 (shown in FIG. 1). Further, the volume setting 406A may include values, (such as, "$V_{A1}$", "$V_{A2}$", "$V_{B1}$", "$V_{B2}$", "$V_{C1}$", "$V_{C2}$", "$V_{D1}$", and "$V_{D2}$" in volts or dB), as shown in various rows of the table 400. Further, the frequency setting 406B may include values or ranges, (such as, "$F_{A1}$", "$F_{A2}$", "$F_{B1}$", "$F_{B2}$", "$F_{C1}$", "$F_{C2}$", "$F_{D1}$", and "$F_{D2}$" in Hz, KHz, or MHz) as shown in various rows of the table 400. Further, the audio output 408 may include exemplary values, such as, "Soothing Music", "Motivational Music", "Instrumental Music", and "Dance music" for the various scenes (i.e., examples in the determined scene 402 column).

In an example, the determined scene 402 may indicate the scenery scene (such as, the scene 312 in FIG. 3A), and in such case, the control circuitry 202 may be configured to control the one or more audio reproduction devices 208 to reproduce the audio output 408 of the corresponding row, for example, the soothing music, as shown in FIG. 4. When the determined distance 404 is "A1", the control circuitry 202 may be configured to adjust the volume setting 406A as "$V_{A1}$", and the frequency setting 406B as "$F_{A1}$". When the determined distance 404 is "A2", the control circuitry 202 may be configured to adjust the volume setting 406A as "$V_{A2}$", and the frequency setting 406B as "$F_{A2}$". In another example, the determined scene 402 may indicate the playground scene (such as, the scene 312 in FIG. 3B), and in such case, the control circuitry 202 may be configured to control the one or more audio reproduction devices 208 to reproduce the audio output 408 of the corresponding row, for example, the motivational music, as shown in FIG. 4. When the determined distance 404 is "B1", the control circuitry 202 may be configured to adjust the volume setting 406A as "$V_{B1}$", and the frequency setting 406B as "$F_{B1}$". When the determined distance 404 is "B2", the control circuitry 202 may be configured to adjust the volume setting 406A as "$V_{B2}$", and the frequency setting 406B as "$F_{B2}$". It may be noted that the data associated with the determined scene 402, the determined distance 404, the one or more audio parameters 406, and the audio output 408 shown in FIG. 4 is presented merely as exemplary values of the data. The present disclosure may be also applicable to other experimental data or values in various formats, without departure from the scope of the disclosure. A description of other experimental data or values has been omitted from the disclosure for the sake of brevity.

Figure 5:
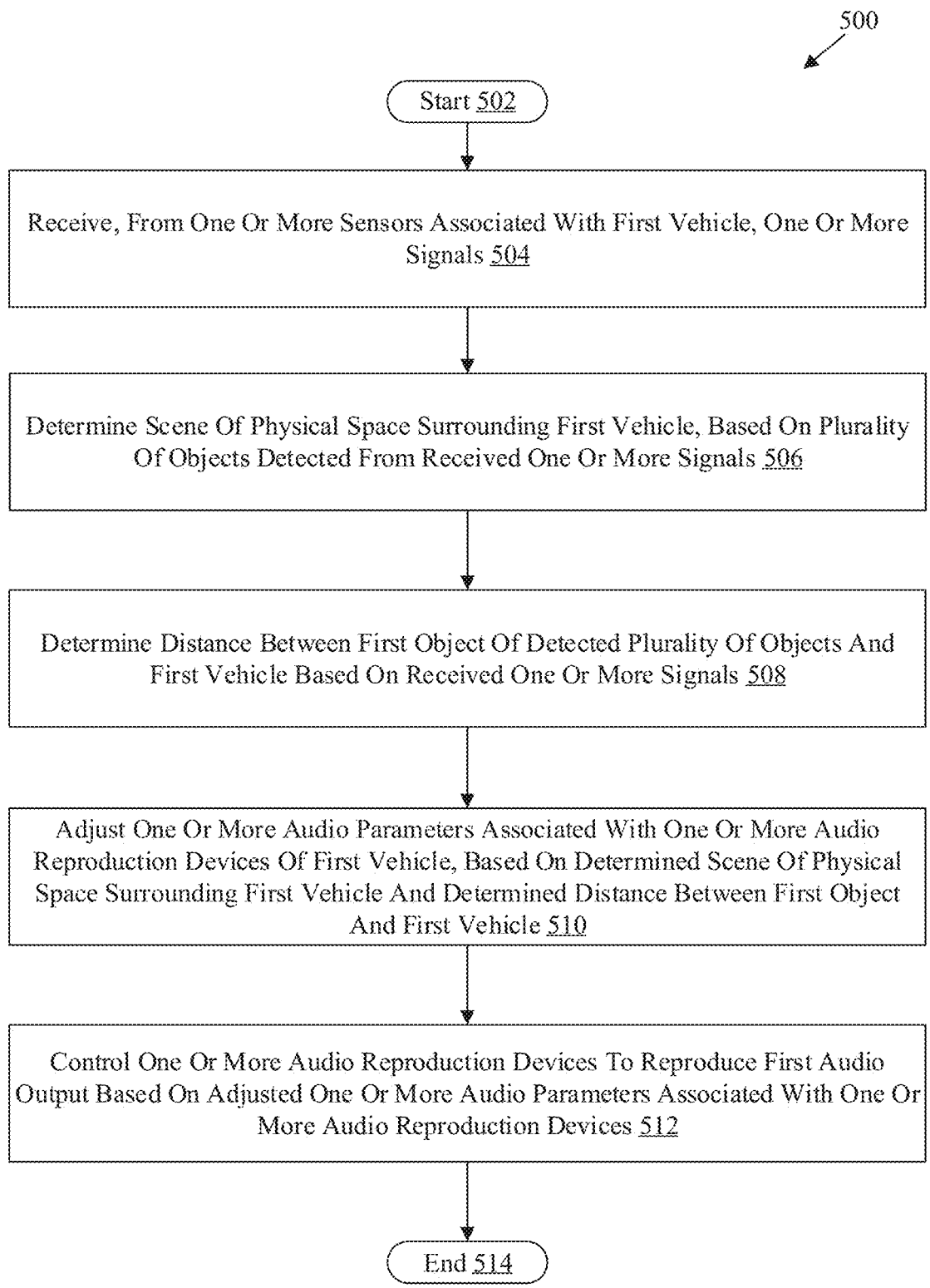
FIG. 5 depicts a flow chart that illustrates exemplary operations for an audio control device for audio control based on determination of physical space surrounding a vehicle, in accordance with an embodiment of the disclosure.

FIG. 5 depicts a flow chart that illustrates exemplary operations for an audio control device for audio control based on determination of a physical space surrounding a vehicle, in accordance with an embodiment of the disclosure. With reference to FIG. 5, there is shown a flowchart 500. The flowchart 500 is described in conjunction with FIGS. 1, 2, 3A, 3B, 3C, 3D, and 4. The operations from 502 to 514 may be implemented by the audio control device 102 shown in FIG. 1, or the control circuitry 202 shown in FIG. 2. The operations of the flowchart 500 may start at 502 and proceed to 504.

At 504, one or more signals may be received from the one or more sensors (e.g., the sensors 310A-310C) associated with a first vehicle. In an embodiment, the control circuitry 202 may be configured to receive the one or more signals, from the one or more sensors (e.g., the first sensor 310A, the second sensor 310B, and the third sensor 310C) associated with a first vehicle (e.g., the first vehicle 302). The one or more signals may correspond to a detection of a plurality of objects (e.g., plurality of objects 114 shown in FIG. 1) present in a physical space (e.g., the physical space 304) surrounding the first vehicle 302. The reception of one or more signals is described, for example, in FIG. 3A.

At 506, a scene (e.g., the scene 312) of the physical space 304 surrounding the first vehicle 302 may be determined. In an embodiment, the control circuitry 202 may be configured to determine the scene 312 of the physical space 304 surrounding the first vehicle 302, based on the plurality of objects 114 detected from the received one or more signals. The determination of scene 312 is described, for example, in FIG. 3A.

At 508, a distance (e.g., the distance 'D') between a first object (e.g., the first object 114A) of the detected plurality of objects 114 and the first vehicle 302 may be determined. In an embodiment, the control circuitry 202 may be configured to determine the distance 'D' between the first object 114A of the detected plurality of objects 114 and the first vehicle 302, based on the received one or more signals. The determination of the distance is described, for example, in FIG. 3A.

At 510, one or more audio parameters associated with the one or more audio reproduction devices (e.g., the first audio reproduction device 308A, and the second audio reproduction device 308B) of the first vehicle 302 may be adjusted. In an embodiment, the control circuitry 202 may be configured to adjust the one or more audio parameters associated with the one or more audio reproduction device 308A-308B, based on the determined scene 312 of the physical space 304 surrounding the first vehicle 302 and the determined distance 'D' between the first object 114A and the first vehicle 302. The adjustment of the one or more audio parameters is described, for example, in FIG. 3A.

At 512, the one or more audio reproduction devices 308A-308B may be controlled to reproduce a first audio output. In an embodiment, the control circuitry 202 may be configured to control the first audio reproduction device 308A and the second audio reproduction device 308B (or other audio reproduction devices) to reproduce the first audio output based on the adjusted one or more audio parameters associated with the first audio reproduction device 308A and the second audio reproduction device 308B. The control of the audio reproduction devices to reproduce the first audio output is described, for example, in FIG. 3A. Control passes to end 514.

Although the flowchart 500 is illustrated as discrete operations, such as 504, 506, 508, 510, and 512, the disclosure may not be so limited. Accordingly, in certain embodiments, such discrete operations may be further divided into additional operations, combined into fewer operations, or eliminated, depending on the particular implementation without detracting from the essence of the disclosed embodiments.

Figure 6:
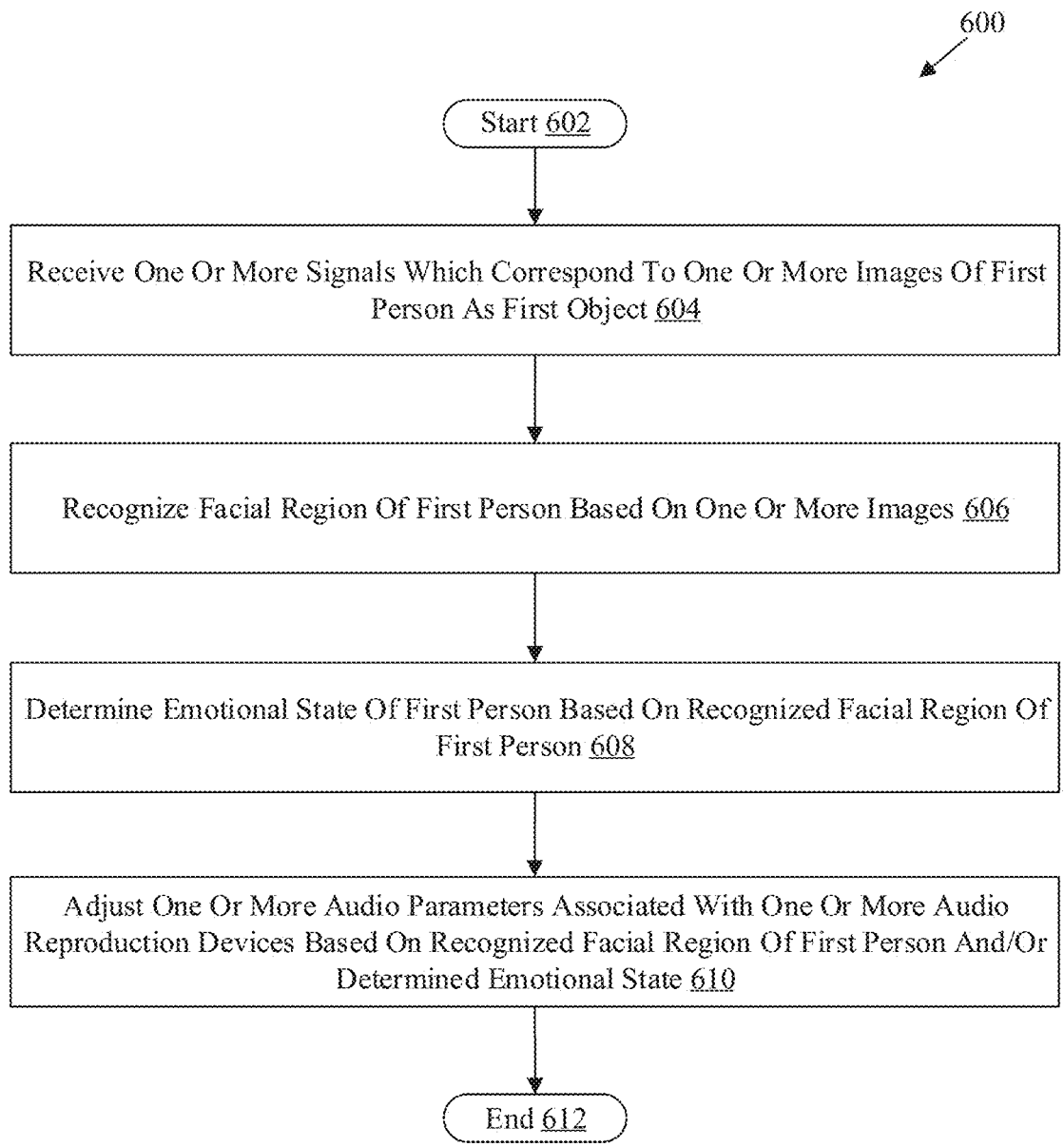
FIG. 6 depicts a flow chart that illustrates exemplary operations for an audio control device for adjustment of one or more audio parameters, in accordance with an embodiment of the disclosure.

FIG. 6 depicts a flow chart that illustrates exemplary operations for an audio control device for adjustment of one or more audio parameters, in accordance with an embodiment of the disclosure. With reference to FIG. 6, there is shown a flowchart 600. The flowchart 600 is described in conjunction with FIGS. 1, 2, 3A, 3B, 3C, 3D, 4, and 5. The operations from 602 to 612 may be implemented by the audio control device 102 shown in FIG. 1, or the control circuitry 202 shown in FIG. 1. The operations of the flowchart 600 may start at 602 and proceed to 604.

At 604, one or more signals from the one or more sensors (e.g., the sensors 310A-310C) may be received. In an embodiment, the control circuitry 202 may be configured to receive one or more signals which correspond to one or more images of a first person, as the first object. In an embodiment, the control circuitry 202 may be configured to receive the one or more signals from a sensor that may be an image capturing device (e.g., the first sensor 310A). The image capturing device may be configured to capture the one or more images of the physical space 304 surrounding the first vehicle 302, where the images of the physical space may include images of the first person (such as the user 314 shown in FIGS. 3A-3D). In some embodiments, the image capturing device may provide the captured one or more images to the control circuitry 202 and the control circuitry 202 may detect the image of the first person (i.e. user 314) in the received one or more images, based on different image processing techniques. Examples of such image processing techniques may include, but are not limited to face detection algorithms, object detection algorithms, deep learning algorithms, and other image processing algorithms, as described, for example, in FIG. 3A.

At 606, a facial region of the first person may be recognized. In an embodiment, the control circuitry 202 may be configured to recognize the facial region of the first person based on the one or more images, by use of an image processing technique, such as, but not limited to, a face detection algorithm, a deep learning algorithm, and other image processing algorithms. The facial region (for example a face area) of the first person may be indicative of an identity of the first person (for example user 314). In an embodiment, the memory 204 may be configured to store identification information (such as name, sample image, and/or user profile) of the first person and corresponding audio parameters to be applied on the audio reproduction devices, based on the identification information of the recognized first person. The memory 204 may thereby store an association between the identification information (or the recognized facial region) of the first person and the one or more audio parameters for the first person.

At 608, an emotional state of the first person may be determined. In an embodiment, the control circuitry 202 may be configured to determine the emotional state of the first person based on the recognized facial region of the first person. In an example, the image capturing device (e.g., the first sensor 310A) may be configured to capture a plurality of images (which may include the one or more images captured at 604) of the recognized first person over a certain time period. The captured plurality of images may be utilized to determine the facial expression of the first person. The facial expression may indicate one or more motions or positions of muscles of a face of the first person, where the facial expressions may manifest an emotion. The muscles of the face may move the skin of the first person, may create facial lines/folds, or may cause the movement of facial features, such as mouth, head, nose, eye, eyebrows of the first person. The control circuitry 202 may be configured to determine the emotional state of the first person based on the determined facial expression of the first person. The plurality of categories of user emotions may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion.

At 610, one or more audio parameters associated with the one or more audio reproduction devices 308A-308B of the first vehicle 302 may be adjusted. In an embodiment, the control circuitry 202 may be configured to adjust the one or more audio parameters associated with the one or more audio reproduction devices 308A-308B based on the recognized facial region of the first person and/or the determined emotional state. For example, the control circuitry 202 may be configured to increase the volume (i.e. audio parameter) of the one or more audio reproduction devices 308A-308B in case the first person may be recognized as a user A, and decrease the volume in case the first person may be recognized as a user B, different from the user "A". In another embodiment, the control circuitry 202 may be configured to adjust the one or more audio parameters associated with the one or more audio reproduction devices 308A-308B based on the determined emotional state. For example, the control circuitry 202 may be configured to increase the volume of the one or more audio reproduction devices 308A-308B in case the emotional state may be determined as a happy emotion, and decrease the volume in case the emotional state may be determined as a sad emotion. The control circuitry 202 may be further configured to determine the first audio output (or the audio content) based on the determined emotional state. For example, the control circuitry 202 may determine the first audio output as "Soothing Music" for a happy emotion, "Motivational Music" for a sad emotion, "Instrumental Music" for a calm emotion, and "Dance music" for an excited emotion. Control passes to end 612.

Although the flowchart 600 is illustrated as discrete operations, such as 604, 606, 608, and 610, the disclosure may not be so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as, the audio control device 102) based on a determination of a physical space surrounding a vehicle. The set of instructions may be executable by the machine and/or the computer to perform the operations that may include reception, from one or more sensors (e.g., the one or more sensors 108A-108E) associated with a first vehicle (e.g., the first vehicle 104), one or more signals. The one or more signals may correspond to a detection of a plurality of objects (e.g., the plurality of objects 114) present in a physical space (e.g., the physical space 106) surrounding the first vehicle 104. The operations may further include determination of a scene (e.g., the scene 112) of the physical space 106 surrounding the first vehicle 104, based on the plurality of objects 114 detected from the received one or more signals. The operations may further include determination of a distance (e.g., the distance 'D') between a first object (e.g., the first object 114A) of the detected plurality of objects 114 and the first vehicle 104 based on the received one or more signals. The operations may further include adjustment of one or more audio parameters associated with one or more audio reproduction devices (e.g., the one or more audio reproduction devices 110A-110D) of the first vehicle 104. The adjustment of the one or more audio parameters may be based on the determined scene 312 of the physical space 106 surrounding the first vehicle 104, and the determined distance (e.g., the distance 'D') between the first object 114A and the first vehicle 104. The operations may further comprise control of the one or more audio reproduction devices 110A-110D to reproduce a first audio output based on the adjusted one or more audio parameters associated with the one or more audio reproduction devices 110A-110D.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An audio control device for a first vehicle, comprising:
control circuitry communicatively coupled to one or more audio reproduction devices of the first vehicle, wherein the control circuitry is configured to:
receive, from one or more sensors associated with the first vehicle, one or more signals, wherein the one or more signals correspond to a detection of a plurality of objects present in a physical space surrounding the first vehicle;
determine a scene of the physical space surrounding the first vehicle, based on the plurality of objects detected from the received one or more signals;
determine a distance between a first object of the detected plurality of objects and the first vehicle, based on the received one or more signals, wherein the first object corresponds to a first person;

receive hearing information of the first person from an electronic apparatus associated with the first person, wherein the hearing information indicates a listening ability of the first person;

adjust one or more audio parameters associated with the one or more audio reproduction devices of the first vehicle, based on the determined scene of the physical space surrounding the first vehicle, the determined distance between the first object and the first vehicle, and the received hearing information; and control the one or more audio reproduction devices to reproduce a first audio output based on the adjusted one or more audio parameters associated with the one or more audio reproduction devices.

2. The audio control device according to claim 1, wherein the one or more sensors comprise at least one of: an image capturing device, a proximity sensor, a Light Detection and Ranging (LIDAR) sensor, a Sound Navigation and Ranging (SONAR) sensor, a Radio Detection and Ranging (RADAR) sensor, or a combination thereof.

3. The audio control device according to claim 1, wherein the determined scene corresponds to at least one of: a day scene, a night scene, a party scene, a scenery scene, a sports scene, a garden scene, a parking lot scene, a playground scene, a road scene, a kid's scene, a romantic scene, a dance scene, a shopping scene, an accident scene, an educational scene, or a religious scene.

4. The audio control device according to claim 1, wherein the control circuitry is further configured to:
classify the first object as one of: the first person, a second vehicle different from the first vehicle, or a first obstacle to the first vehicle; and
control the one or more audio parameters of the one or more audio reproduction devices based on the classification of the first object.

5. The audio control device according to claim 1, wherein the one or more audio parameters comprise at least one of: a volume setting, a frequency setting, an equalization mode, an activation status of the one or more audio reproduction devices, or a directionality of an audio reproduced by the one or more audio reproduction devices.

6. The audio control device according to claim 1, wherein the control circuitry is further configured to:
determine a three-dimensional location of the first object in the physical space surrounding the first vehicle based on the one or more signals received from the one or more sensors; and
control the one or more audio parameters of the one or more audio reproduction devices based on the determined three-dimensional location of the first object.

7. The audio control device according to claim 6, wherein the control circuitry is further configured to control an activation status of a first audio reproduction device from the one or more audio reproduction devices based on the determined three-dimensional location of the first object.

8. The audio control device according to claim 6, wherein the control circuitry is further configured to adjust a directionality of an audio reproduced by the one or more audio reproduction devices based on the determined three-dimensional location of the first object.

9. The audio control device according to claim 1, wherein the control circuitry is further configured to determine the first audio output based on the determined scene of the physical space surrounding the first vehicle.

10. The audio control device according to claim 1, wherein the control circuitry is further configured to:

receive an audio signal from the electronic apparatus associated with the first person; and
control the one or more audio parameters of the one or more audio reproduction devices based on the received audio signal.

11. The audio control device according to claim 1, wherein the control circuitry is further configured to transmit a notification signal to the electronic apparatus associated with the first person, and wherein the notification signal is indicative of one or more operations associated with the first vehicle.

12. The audio control device according to claim 1, wherein the received one or more signals correspond to one or more images of the first person, and the wherein the control circuitry is further configured to:
recognize a facial region of the first person based on the one or more images; and
adjust the one or more audio parameters associated with the one or more audio reproduction devices based on the recognized facial region of the first person.

13. The audio control device according to claim 12, wherein the control circuitry is further configured to:
determine an emotional state of the first person based on the recognized facial region of the first person; and
adjust the one or more audio parameters associated with the one or more audio reproduction devices based on the determined emotional state.

14. The audio control device according to claim 1, further comprising a memory including a lookup-table that stores an association between the determined scene, the determined distance, and the one or more audio parameters.

15. An audio control device for a first vehicle, comprising:
control circuitry communicatively coupled to one or more audio reproduction devices of the first vehicle, wherein the control circuitry is configured to:
receive, from one or more sensors associated with the first vehicle, one or more signals, wherein the one or more signals correspond to a detection of a plurality of objects present in a physical space surrounding the first vehicle;
determine a scene of the physical space surrounding the first vehicle, based on the plurality of objects detected from the received one or more signals;
determine a distance between a first object of the detected plurality of objects and the first vehicle, based on the received one or more signals, wherein the first object corresponds to a first person;
recognize a facial region of the first person based on one or more images of the first person, wherein the received one or more signals further correspond to the one or more images of the first person;
adjust one or more audio parameters associated with the one or more audio reproduction devices of the first vehicle, based on the determined scene of the physical space surrounding the first vehicle, the determined distance between the first object and the first vehicle, and the recognized facial region of the first person; and
control the one or more audio reproduction devices to reproduce a first audio output based on the adjusted one or more audio parameters associated with the one or more audio reproduction devices.

16. An audio control device for a first vehicle, comprising:
control circuitry communicatively coupled to one or more audio reproduction devices of the first vehicle, wherein the control circuitry is configured to:

receive, from one or more sensors associated with the first vehicle, one or more signals, wherein the one or more signals correspond to a detection of a plurality of objects present in a physical space surrounding the first vehicle;

determine a scene of the physical space surrounding the first vehicle, based on the plurality of objects detected from the received one or more signals;

determine a distance between a first object of the detected plurality of objects and the first vehicle, based on the received one or more signals, wherein the first object corresponds to a first person;

recognize a facial region of the first person based on one or more images of the first person, wherein the received one or more signals further correspond to the one or more images of the first person;

determine an emotional state of the first person based on the recognized facial region of the first person;

adjust one or more audio parameters associated with the one or more audio reproduction devices of the first vehicle, based on the determined scene of the physical space surrounding the first vehicle, the determined distance between the first object and the first vehicle, and the determined emotional state of the first person; and control the one or more audio reproduction devices to reproduce a first audio output based on the adjusted one or more audio parameters associated with the one or more audio reproduction devices.

* * * * *